(12) United States Patent
Cui et al.

(10) Patent No.: US 12,401,476 B2
(45) Date of Patent: Aug. 26, 2025

(54) REFERENCE SIGNAL TRANSITION FOR RADIO LINK MONITORING AND BEAM FAILURE DETECTION

(71) Applicant: APPLE INC., Cupertino, CA (US)

(72) Inventors: Jie Cui, San Jose, CA (US); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Qiming Li, Beijing (CN); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 292 days.

(21) Appl. No.: 17/441,856

(22) PCT Filed: May 7, 2021

(86) PCT No.: PCT/CN2021/092074
§ 371 (c)(1),
(2) Date: Sep. 22, 2021

(87) PCT Pub. No.: WO2022/233022
PCT Pub. Date: Nov. 10, 2022

(65) Prior Publication Data
US 2023/0231680 A1    Jul. 20, 2023

(51) Int. Cl.
*H04L 5/00* (2006.01)
*H04W 24/08* (2009.01)
*H04W 76/28* (2018.01)

(52) U.S. Cl.
CPC .......... *H04L 5/0051* (2013.01); *H04W 24/08* (2013.01); *H04W 76/28* (2018.02)

(58) Field of Classification Search
CPC ...... H04L 5/0051; H04W 76/28; H04W 24/08
See application file for complete search history.

(56) References Cited

U.S. PATENT DOCUMENTS

| 11,903,069 B2* | 2/2024 | Sengupta | H04W 72/21 |
| 11,923,945 B2* | 3/2024 | Koskela | H04W 24/08 |
| 2019/0261244 A1 | 8/2019 | Jung et al. | |
| 2019/0306765 A1 | 10/2019 | Cirik et al. | |

(Continued)

FOREIGN PATENT DOCUMENTS

| CN | 110351112 A | 10/2019 |
| CN | 112514524 | 3/2021 |

(Continued)

OTHER PUBLICATIONS

Article entitled, "Potential Use Cases of Enhancing Radio Link Failure Report in NR", Ericsson, NR 3GPP TSG-RAN WG3 #106, R2-1906892, dated May 17, 2019 in 7 pages.

(Continued)

*Primary Examiner* — Michael J Moore, Jr.
(74) *Attorney, Agent, or Firm* — Kilpatrick Townsend & Stockton LLP

(57) ABSTRACT

The present application relates to devices and components including apparatus, systems, and methods for radio link monitoring and/or beam failure detection operations in wireless communication systems.

20 Claims, 18 Drawing Sheets

(56) References Cited

U.S. PATENT DOCUMENTS

| | | |
|---|---|---|
| 2019/0306909 A1 | 10/2019 | Zhou et al. |
| 2019/0319833 A1 | 10/2019 | Nagaraja et al. |
| 2019/0357291 A1 | 11/2019 | Zhou et al. |
| 2020/0145280 A1 | 5/2020 | Cirik et al. |
| 2020/0145983 A1* | 5/2020 | Levitsky ................. H04L 5/005 |
| 2020/0314676 A1* | 10/2020 | Lin ....................... H04L 5/0094 |
| 2020/0314708 A1* | 10/2020 | Jassal .................. H04W 72/046 |
| 2021/0058805 A1* | 2/2021 | Ji ........................... H04W 72/56 |
| 2021/0153285 A1 | 5/2021 | Hu et al. |
| 2021/0242922 A1* | 8/2021 | Koskela ................. H04W 72/23 |
| 2021/0351975 A1* | 11/2021 | Matsumura ............ H04B 7/088 |
| 2022/0022065 A1* | 1/2022 | Wang ................... H04B 7/0695 |
| 2022/0200675 A1* | 6/2022 | Raghavan ............. H04B 7/0695 |
| 2022/0225135 A1* | 7/2022 | Cirik .................... H04L 5/0091 |
| 2022/0322310 A1* | 10/2022 | Laddu ................... H04L 1/1812 |
| 2023/0053871 A1* | 2/2023 | Tran ...................... H04B 7/088 |
| 2023/0145663 A1* | 5/2023 | Kwon ................... H04L 5/0057 370/318 |
| 2023/0231680 A1* | 7/2023 | Cui ....................... H04L 5/0051 370/329 |
| 2023/0269041 A1* | 8/2023 | Rong .................... H04L 5/0053 370/329 |
| 2023/0337020 A1* | 10/2023 | Da Silva ............... H04W 24/04 |
| 2023/0413077 A1* | 12/2023 | Määttänen ............ H04W 24/08 |
| 2024/0014880 A1* | 1/2024 | Svedman ........... H04B 7/06968 |

FOREIGN PATENT DOCUMENTS

| | | | |
|---|---|---|---|
| CN | 112534742 A | 3/2021 | |
| EP | 3553969 A1 | 10/2019 | |
| WO | 2019242853 | 12/2019 | |
| WO | WO-2019229292 A1 * | 12/2019 | |
| WO | WO-2020102072 A1 * | 5/2020 | ............ H04L 5/0048 |
| WO | WO-2020227139 A1 * | 11/2020 | ............. H04B 7/088 |
| WO | WO-2021168241 A1 * | 8/2021 | ........... H04B 7/0695 |
| WO | WO-2021229545 A1 * | 11/2021 | ........... H04B 7/0695 |
| WO | WO-2022031205 A1 * | 2/2022 | ........ H04W 52/0229 |
| WO | WO-2022084544 A1 * | 4/2022 | ........ H04W 52/0209 |
| WO | WO-2022133009 A2 * | 6/2022 | ............ H04L 5/0048 |
| WO | WO-2022207117 A1 * | 10/2022 | ............. H04B 7/022 |

OTHER PUBLICATIONS

Takeda, et al., arXiv:1910.01711 [cs.NI], "Understanding the Heart of the 5G Air Interface: An Overview of Physical Downlink Control Channel for 5G New Radio (NR)," in 8 pages.

International Search Report and Written Opinion issued in PCT Application No. PCT/CN2021/092074, dated Jan. 25, 2022 in 9 pages.

Technical Specification entitled: "Requirements for support of radio resource management (3GPP TS 38.133 version 16.7.0 Release 16)," 5G; NR; ETSI TS 138 133 V16.7.0 (Jun. 2021) in 2196 pages.

European Patent Application No. 21939669.4 , "Partial Supplementary European Search Report", Dec. 6, 2024, 12 pages.

* cited by examiner

REFERENCE SIGNAL TRANSITION FOR RADIO LINK MONITORING AND BEAM FAILURE DETECTION

This application is a 35 U.S.C. § 371 National Stage Entry of International Application No. PCT/CN2021/092074, filed on May 7, 2021, which is incorporated herein by reference in its entirety for all purposes.

BACKGROUND

Radio link monitoring techniques are described in existing Third Generation Partnership Project (3GPP) networks. These techniques may be used to address a radio link failure that may occur if a handover procedure is unsuccessful or necessary but not performed. Beam failure recovery techniques are also described in existing 3GPP networks. These techniques include detecting a beam failure, finding and selecting a new beam, and recovering a connection.

DETAILED DESCRIPTION

Figure 1:
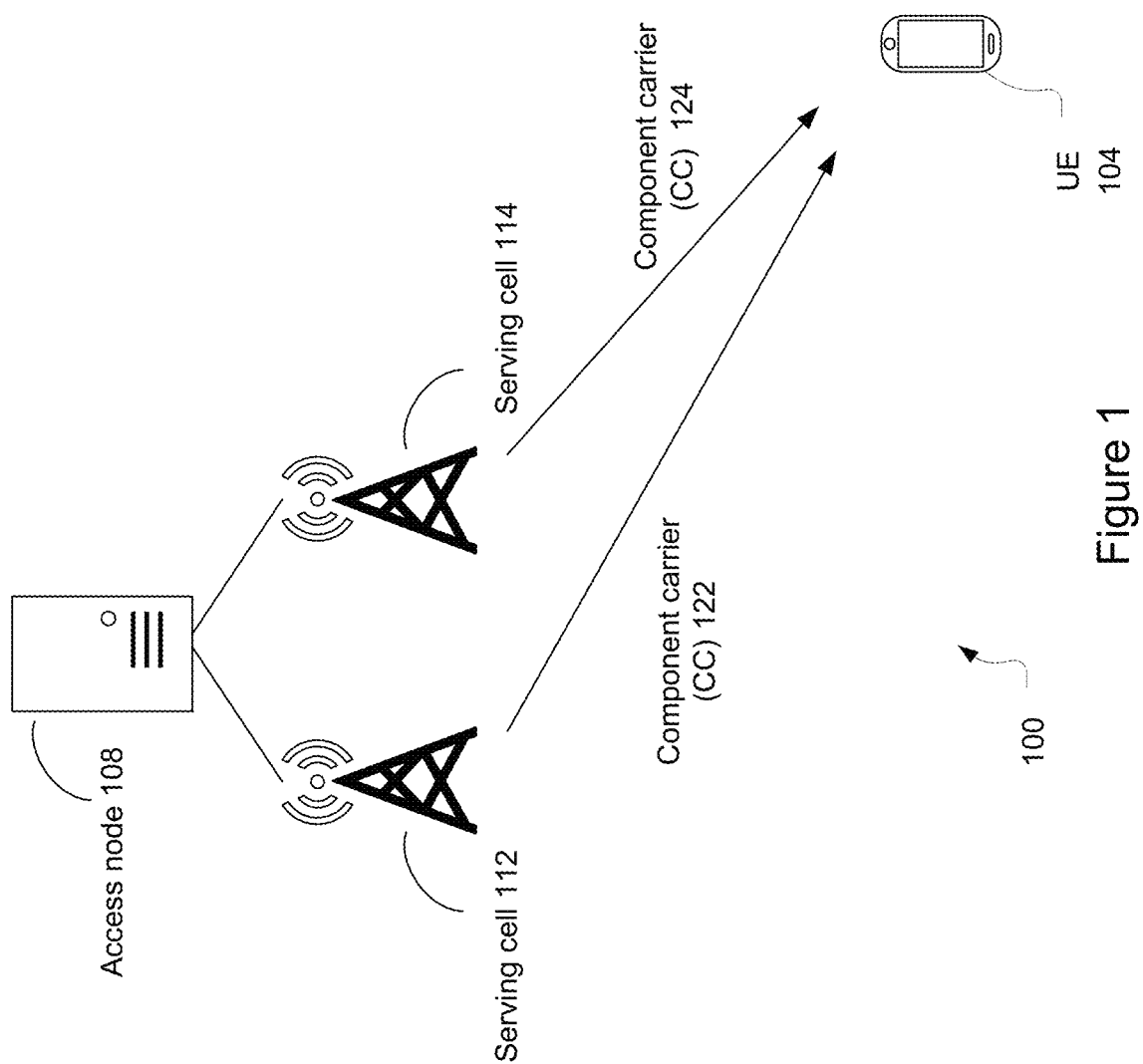
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment"

or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for handling transitions in reference signal configurations that may affect timing of evaluation periods for radio link monitoring and/or beam failure detection are described herein. FIG. 1 illustrates a network environment 100 in accordance with some embodiments. The network environment 100 may include a UE 104 and an access node (or "base station") 108. The access node 108 may provide one or more wireless serving cells 112 and 114, for example, 3GPP New Radio "NR" cells, through which the UE 104 may communicate with the access node 108 (e.g., over an NR-Uu interface).

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, a Master Information Block (MIB)), and paging messages.

The access node (e.g., base station or gNB) 108 may also transmit various reference signals to the UE 104. A Reference Signal (RS) is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 104 to determine the desired downlink beam pair for transmitting/receiving PDCCH and PDSCH transmissions. The UE may use a Physical Uplink Control Channel (PUCCH) to transmit uplink control information (UCI) to the access node 108, including, for example, hybrid-automatic repeat request (HARQ) acknowledgements, scheduling requests, and periodic and semi-persistent channel state information (CSI) reports.

The access node 108 may configure the UE 104 with transmission control indicator (TCI) state information to indicate quasi-co-location (QCL) relationships between antenna ports used for reference signals (for example, SSB or CSI-RS) and downlink data or control signaling (for example, PDSCH or PDCCH). The access node 108 may use a combination of RRC signaling, MAC control element signaling, and/or downlink control information (DCI) to inform the UE 104 of these QCL relationships.

Initially, the access node 108 may configure the UE 104 with a plurality of TCI states through RRC signaling. In some embodiments, up to 128 TCI states may be configured for PDSCH through, for example, a PDSCH-config information element (IE), and up to 64 TCI states may be configured for PDCCH through, for example, a PDCCH-config IE. Each TCI state may include a physical cell ID (PCI), a bandwidth part ID, an indication of the relevant SSB or CSI-RS, and an indication of the QCL type. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The TCI states may be set as inactive after initial configuration. The access node 108 may then transmit an activation command through, for example, a MAC control element. The activation command may activate up to eight combinations of one or two TCI states that correspond to eight codepoints of a TCI field in DCI. One or more specific TCI states may then be dynamically selected and signaled using the TCI field in DCI to indicate which of the active TCI states are applicable to a PDSCH resource allocation.

An access node 108 may transmit the PDCCH using resource elements that belong to a control resource set (CORESET). A search space configuration may refer to a particular CORESET to define a search space, for example, a specific set of resource blocks and symbols where the UE 104 is to attempt to decode the PDCCH. An access node 108 may configure up to three CORESETs for an active downlink bandwidth part of a serving cell. The CORESET may be configured by a ControlResourceSet information element that defines frequency domain resources to indicate resource blocks allocated to the CORESET, a duration to indicate a number of symbols allocated to the CORESET (which may be 1, 2, or 3 orthogonal frequency division multiplexing (OFDM) symbols), and QCL information to support a successful reception of the PDCCH.

The QCL information in the ControlResourceSet information element may be provided by listing identities of TCI states. The TCI states identified in the ControlResourceSet information element may be a subset of the TCI states defined in the PDSCH-config that are in the active downlink bandwidth part to which the CORESET belongs. If the ControlResourceSet information element only provides a single TCI state, the UE 104 may assume a QCL relationship between the PDCCH and reference signal specified by that TCI state. If a plurality of TCI states are listed, the UE 104 may rely on an activation command, such as that described above, to identify the TCI state to apply.

The UE 104 may include enhanced Multiple-Input-Multiple-Output (eMIMO) capabilities that support simultaneous communication over beams from several (or even many) different serving cells. FIG. 1 shows an example of carrier aggregation (CA), in which the UE 104 receives data from access node 108 simultaneously from serving cell 112 over a component carrier (CC) 122 and from serving cell 114 over a component carrier (CC) 124.

The CC 122 may be in a band in Frequency Range 1 (FR1) or in Frequency Range 2 (FR2). Likewise the CC 124 may be in a band in FR1 or in FR2. The CCs 112 and 124 may be in the same band (intra-band, either contiguous or non-contiguous) or may be in different bands (inter-band) and possibly different frequency ranges. For FR1 (e.g., below 7.225 GHz), a transmit antenna of the UE 104 is typically implemented as an omnidirectional antenna. For FR2 (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction).

Figure 2:
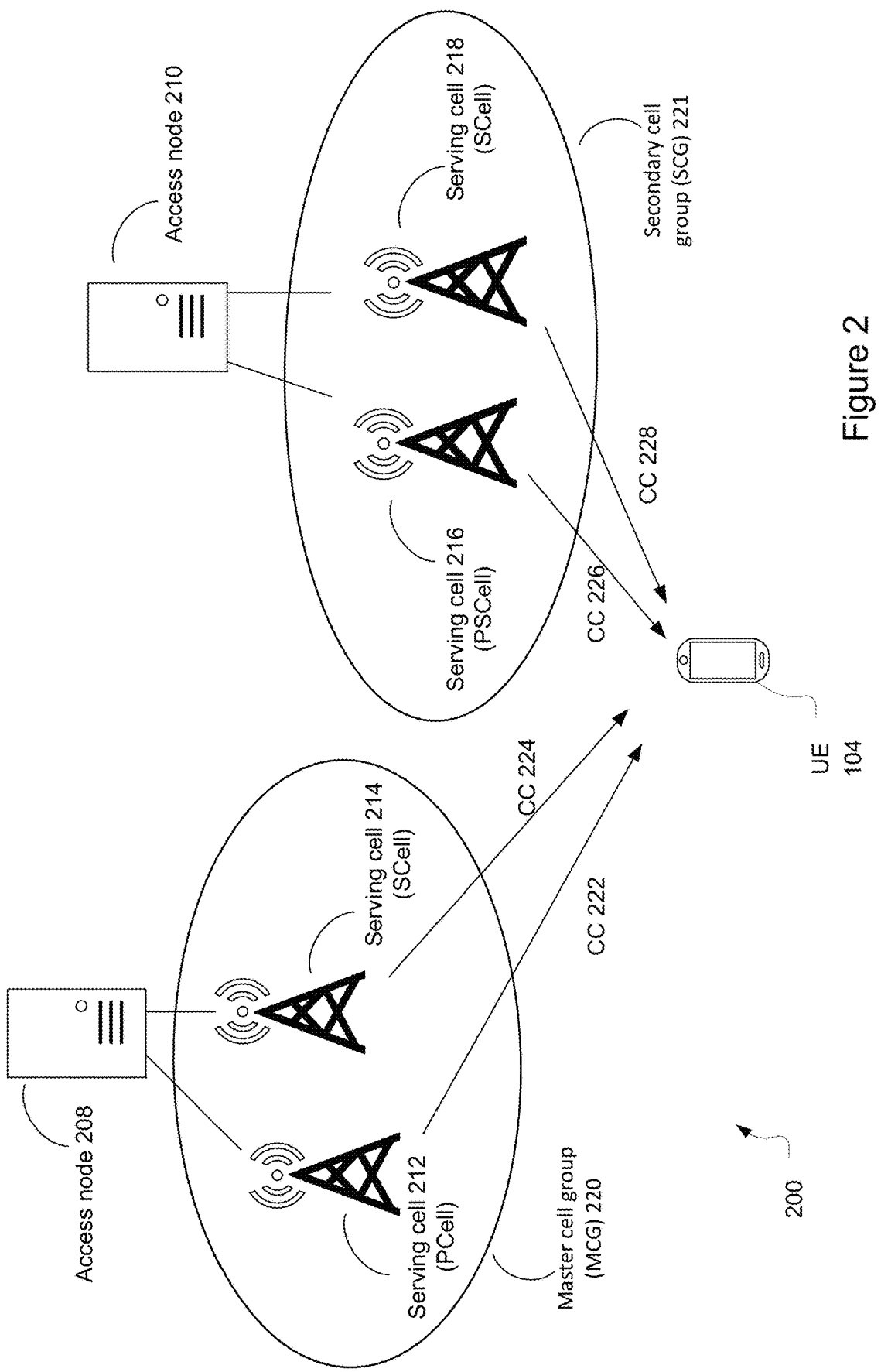
FIG. 2 illustrates a network environment in accordance with some embodiments.

FIG. 2 illustrates a network environment 200 in accordance with some embodiments. The network environment 100 may include the UE 104 and two or more access nodes (or "base stations") 208 and 210. Each of the access nodes 208 and 210 may provide one or more wireless serving cells, for example, 3GPP New Radio (NR) cells, through which the UE 104 may communicate with the access nodes 208 and 210. In this example, access node 208 provides two serving cells 212 and 214 that communicate with the UE 104 over CCs 222 and 224, respectively, and access node 210 provides two serving cells 216 and 218 that communicate with the UE 104 over CCs 226 and 228, respectively.

The UE 104 may communicate with the access nodes 208 and 210 over an air interface compatible with 3GPP technical specifications such as those that define Fifth Generation (5G) NR system standards. Each of the access nodes 208 and 210 may be a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

FIG. 2 illustrates an example of dual connectivity (DC), in which the UE 104 may simultaneously transmit and receive data on multiple component carriers (CCs) from two different cell groups. In this example, access node 208 is the master node that provides the control plane connection to the core network, and access node 210 is the secondary node. The master node may be coupled with a 5G core (5GC) network via a backhaul connection that may support an NG-C interface. The serving cells provided by the master node (access node 208 in this example) comprise a master cell group (MCG) 220, and the serving cells provided by the secondary node (access node 210 in this example) comprise a secondary cell group (SCG) 221. Each of the MCG 220 and SCG 221 has a primary serving cell and, optionally, one or more secondary serving cells. A primary serving cell (also called special cell or spCell) of the MCG 220 may be referred to as PCell, and a secondary serving cell of the MCG 221 may be referred to as an SCell. A primary serving cell (spCell) of the SCG 220 may be referred to as PSCell, and a secondary serving cell of the SCG 221 may be referred to as an SCell or SSCell. In FIG. 2, serving cell 212 is the PCell, serving cell 216 is the PSCell, and serving cells 214 and 218 are SCells. The term "primary serving cell" may refer to either one of PCell and PSCell unless otherwise indicated, the term "secondary serving cell" may refer to either one of a secondary serving cell of the MCG and a secondary serving cell of the SCG unless otherwise indicated, and the term "SCell" may also refer to either one of a secondary serving cell of the MCG and a secondary serving cell of the SCG unless otherwise indicated.

Section 8 of 3GPP Technical Specification (TS) 38.133 (V16.7.0 (2021-03), "Requirements for support of radio resource management") indicates that a UE "shall monitor the downlink radio link quality based on the reference signal configured as RLM-RS resource(s) in order to detect the downlink radio link quality of the PCell and PSCell." This section also indicates that on each RLM-RS resource, the UE "shall estimate the downlink radio link quality" and compare it to thresholds "for the purpose of monitoring downlink radio link quality of the cell."

The UE 104 may monitor downlink radio link quality of the primary cells (PCell and PSCells) for purposes of indicating out-of-sync/in-sync status to higher layers and, potentially, declaring a radio link failure. For example, the UE 104 may generate out-of-sync indications if the downlink radio link quality on all RLM-RSs estimated over the last evaluation period is below a first quality level (Qout) at which the radio link is considered unreliable, which may be based on an out-of-sync BLER (BLERout) value of a hypothetical PDCCH transmission; and the UE 104 may generate an in-sync indication if the downlink radio link quality on at least one RLM-RS estimated over the last evaluation period exceeds a second quality level (Qin) at which the radio link is considered reliable, which may be based on an in-sync BLER value (BLERin) of the hypothetical PDCCH transmission. The evaluation periods may have a periodicity referred to as an in-sync/out-of-sync (IS/OOS) periodicity. In some embodiments, the BLERout may be set at 10% and BLERin may be set at 2%.

Section 8.5.1 of 3GPP TS 38.133 indicates that a UE "shall assess the downlink radio link quality of a serving cell based on the reference signal in a set $\bar{q}_0$," in order to detect beam failure on the PCell, PSCell, and SCells. The RS resource configurations in the set $\bar{q}_0$ on PCell or PSCell may be periodic CSI-RS resources and/or SSBs, and the RS resource configuration in the set $\bar{q}_0$ on SCell may be periodic CSI-RS. For each RS resource configuration in the set $\bar{q}_0$, the UE 104 may estimate the beam quality and compare the estimate to a quality level (e.g., a threshold $Q_{out\_LR}$) in order to assess downlink beam quality of the serving cell beams. The UE 104 may generate a beam failure instance if a beam quality of the BFD-RS falls below the quality level, which may correspond to a quality at which a block error rate (BLER) for a hypothetical PDCCH transmission is 10%.

A network may signal a change in an operating state of a UE. In one example, a network may signal a change in an operating state of a UE by signaling a change in a discontinuous reception (DRX) mode of the UE. A change in a DRX mode of a UE may be a transition from DRX to no DRX, a transition from no DRX to DRX, or a change in the timing (e.g., a change in the periodicity) of a DRX cycle of the UE.

Section 8.1.4 of 3GPP TS 38.133 states that

"When the UE transitions between DRX and no DRX or when DRX cycle periodicity changes, for each RLM-RS resource, for a duration of time equal to the evaluation period corresponding to the second mode after the transition occurs, the UE shall use an evaluation period that is no less than the minimum of evaluation period corresponding to the first mode and the second mode. Subsequent to this duration, the UE shall use an evaluation period corresponding to the second mode for each RLM-RS resource. This requirement shall be applied to both out-of-sync evaluation and in-sync evaluation of the monitored cell."

A network may use DRX to reduce power consumption by the UE, and the network may signal a change in DRX mode based on a traffic situation. If a network does not have sufficient traffic to schedule a UE, for example, the network may configure the UE to begin DRX (i.e., to change from a DRX-inactive mode (no DRX) to a DRX-active mode (DRX)). Depending on how often the data will be scheduled, that network can also determine a timing (e.g., a periodicity) of the DRX cycle (e.g., a long DRX cycle or a short DRX cycle). If the network has no data to schedule this UE within a certain period, then the network can configure the UE to have a very long DRX cycle (e.g., a large periodicity) to save the power for the UE. The factors upon which the duration of the BFD evaluation period is based include whether the UE is in a DRX-active mode and, if so, whether the DXR cycle is greater than 320 ms. Accordingly, a change in the DRX mode of a UE may cause the duration of the BFD evaluation period to change.

3GPP TS 38.133 fails to indicate a UE behavior for handling a change in BFD evaluation period duration resulting from a DRX mode transition. For example, the TS does not indicate whether an estimate of beam quality for the first evaluation period that ends after the time of the DRX mode transition may be based on samples of a BFD-RS that were taken before the time of transition.

A solution to this problem is now presented. When the UE transitions between DRX and no DRX or when DRX cycle periodicity changes, for each BFD-RS resource, for a duration of time equal to the evaluation period corresponding to the second mode after the transition occurs, the UE may use an evaluation period that is no less than the minimum of evaluation period corresponding to the first mode and the second mode. Subsequent to this duration, the UE may use an evaluation period corresponding to the second mode for each BFD-RS resource.

Figure 3:
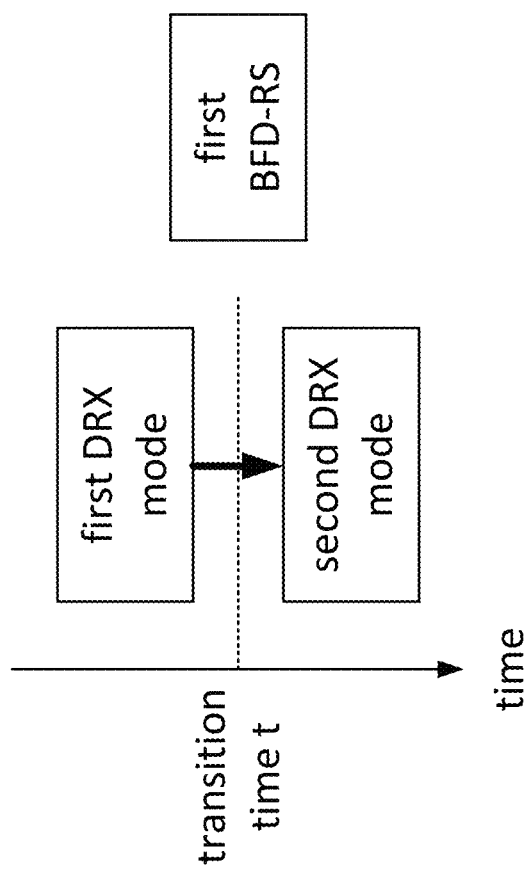
FIG. 3 shows an example of a transition from one DRX mode to another.

FIG. 3 shows an example in which a UE that is configured to evaluate a downlink beam quality on a first beam failure detection-reference signal (BFD-RS) transitions at a time t from a first (old) DRX mode to a second (new) DRX mode. The first BFD-RS may be, for example, a periodic CSI-RS or an SSB. In the first DRX mode, the UE is configured to use an evaluation period having a first duration for evaluating the downlink beam quality on the first BFD-RS, and in the second DRX mode, the UE is configured to use an evaluation period having a second duration for evaluating the downlink beam quality on the first BFD-RS. The second duration may have be the same as, or may be longer or shorter than, the first duration. For each of the evaluation periods having the first duration and for each of the evaluation periods having the second duration, the UE is configured to estimate the downlink beam quality on the first BFD-RS over the evaluation period based on samples of the first BFD-RS (e.g., received signal power) taken during the evaluation period. An active TCI state of the CORESET of the UE is the same before and after the DRX mode transition.

At the transition time t, the UE is configured to use a mixed evaluation period for evaluating the downlink beam quality on the first BFD-RS. This evaluation period begins prior to the transition time t (e.g., at the start of the ongoing evaluation period having the first duration) and ends after the transition time t (e.g., at the time equal to the second duration after transition time t). The UE is configured to estimate the downlink beam quality on the first BFD-RS over the mixed evaluation period based on samples of the first BFD-RS (e.g., received signal power) taken during the mixed evaluation period (e.g., based on samples taken before transition time t and on samples taken after transition time t).

Figure 4:
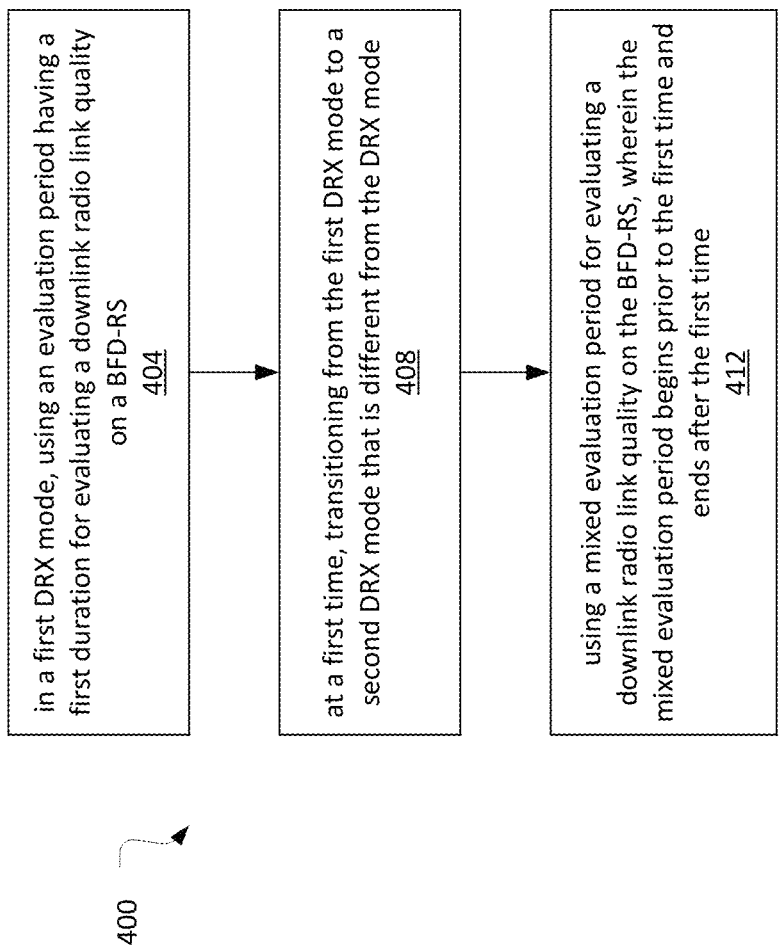
FIG. 4 illustrates an operational flow/algorithmic structure in accordance with some embodiments.

FIG. 4 illustrates an operation flow/algorithmic structure 400 in accordance with some embodiments. The operation flow/algorithmic structure 400 may be performed or implemented by a UE such as, for example, UE 104 or UE 1500; or components thereof, for example, baseband processor 1504A.

The operation flow/algorithmic structure 400 may include, at 404, in a first DRX mode, using an evaluation period having a first duration for evaluating a downlink beam quality on a BFD-RS.

The operation flow/algorithmic structure 400 may further include, at 408, at a first time, transitioning from the first DRX mode to a second DRX mode that is different from the DRX mode. A DRX cycle periodicity of the first DRX mode may be different than a DRX cycle periodicity of the second DRX mode, or DRX may be active during one of the first DRX mode and the second DRX mode and inactive during the other of the first DRX mode and the second DRX mode.

The operation flow/algorithmic structure 400 may further include, at 412, using a mixed evaluation period for evaluating a downlink beam quality on the BFD-RS, wherein the mixed evaluation period begins prior to the first time and ends after the first time. The duration of the mixed evaluation period may be different than the first duration. An active transmission configuration indicator (TCI) state of the CORESET of the UE may remain unchanged during the mixed evaluation period.

Figure 5:
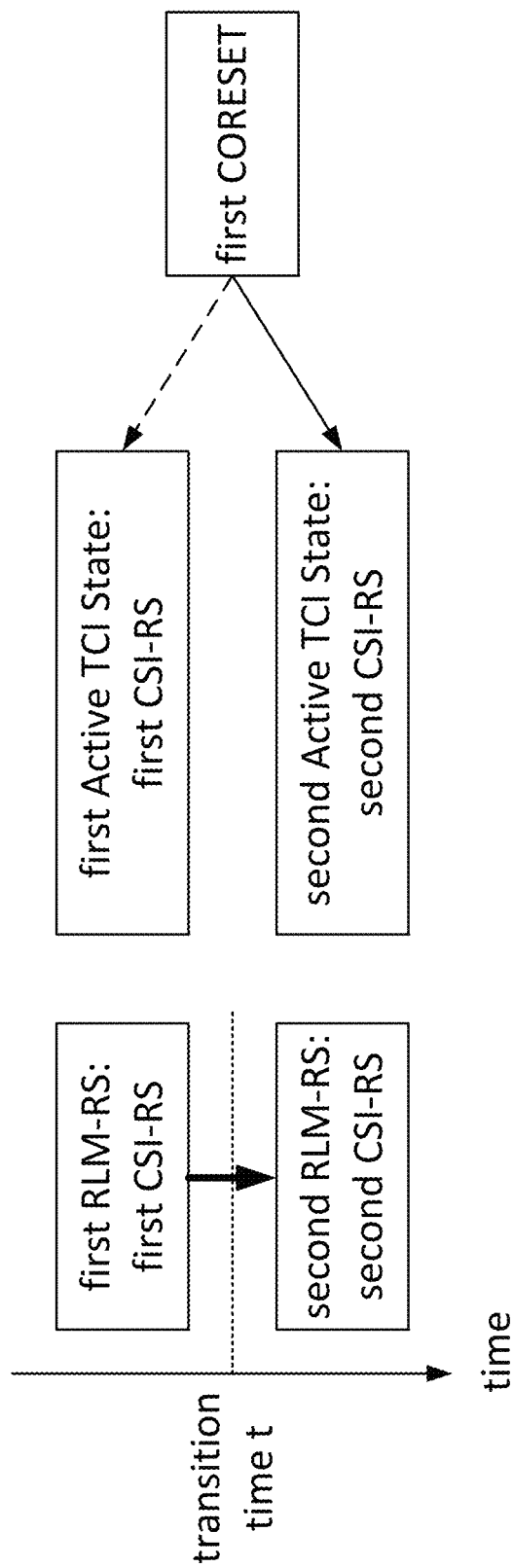
FIG. 5 shows an example of a transition from one radio link monitoring-reference signal to another.

In another example, a network may signal a change in an operating state of a UE by signaling a change in an active TCI state of the UE. FIG. 5 shows an example in which a UE is configured to evaluate a downlink radio link quality on a first radio link monitoring-reference signal (RLM-RS) that is a first CSI-RS. At a time t, the UE transitions to being configured to evaluate a downlink radio link quality on a second RLM-RS that is a second CSI-RS, and the active TCI state of a first CORESET of the UE before the transition time t is different than the active TCI state after the transition time t. The first CSI-RS is the RS specified by the active TCI state before the transition time t, and the second CSI-RS is the RS specified by the active TCI state after the transition time t.

Section 8.1.4 of 3GPP TS 38.133 states that

"When the UE transitions from a first configuration of active TCI state of the CORESET to a second configuration of active TCI state of the CORESET, for each CSI-RS for RLM present in the second configuration, the UE shall use an evaluation period corresponding to the second configuration from the time of transition. This requirement shall be applied to both out-of-sync evaluation and in-sync evaluation of the monitored cell."

In a case as shown in FIG. 5, there is a change in the active TCI state for the CORESET. If a CSI-RS is used as RLM-RS, and if the new CSI-RS for RLM and the old CSI-RS for RLM are associated with the different active TCI state of the same CORESET, then the UE may drop the old CSI-RS evaluation and start the evaluation based on the new CSI-RS.

The change in the active TCI state for one CORESET implies the CSI-RS is changed from one CSI-RS to another CSI-RS. However, this case does not cover a situation in which the active TCI state is not changed, but the RLM-RS is changed from SSB (SSB is QCLed with the active TCI state of a CORESET) to CSI-RS (in the active TCI state of the same CORESET). As discussed herein, even though the active TCI state is not changed, the transition may also specify that the UE cannot merge the evaluation period before and after this reconfiguration.

A TCI state may be used to define a specific quasi-co-location (QCL) relationship between the PDCCH and an RS (a CSI-RS or SSB), or between the PDSCH and an RS (a CSI-RS or SSB). A network may signal a change in an active TCI state of the UE in response to a report of beam measurement results by the UE. For example, the UE may send a report of beam measurement results to the network which indicates that a transmit beam associated with a TCI state that is different than the current active TCI state may be better for UE scheduling and/or UE control channel transmission than a transmit beam associated with the current active TCI state. In response to such a report, the network may signal the UE to switch its active TCI state to the different TCI state.

Figure 6:
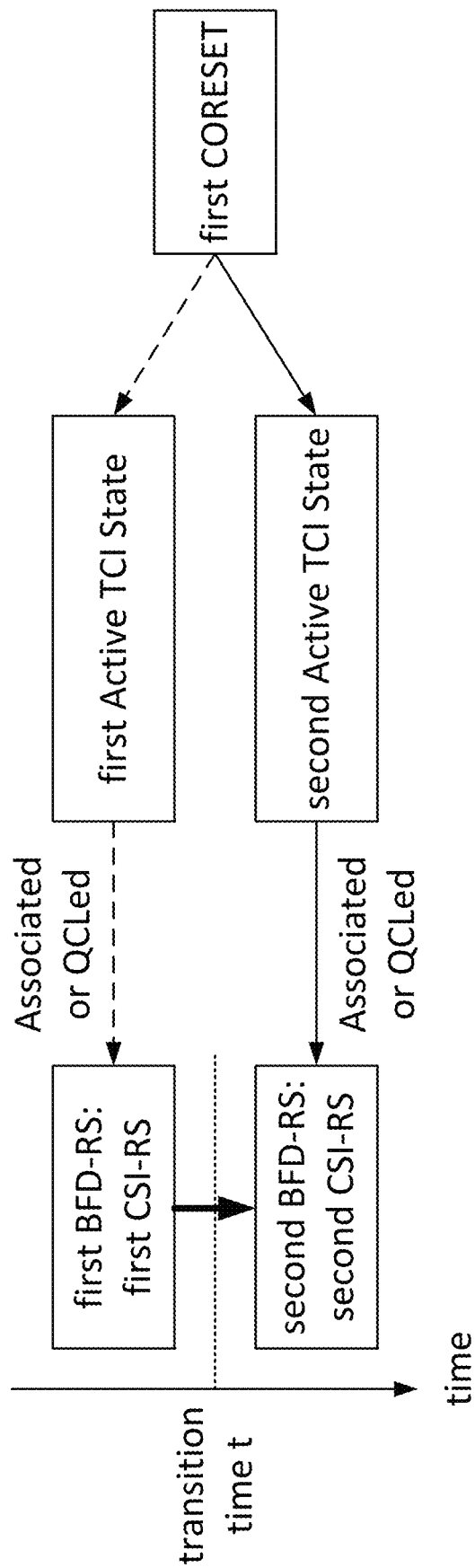
FIG. 6 shows an example of a transition from one beam failure detection-reference signal to another.

FIG. 6 shows an example in which a UE that is configured to evaluate a downlink beam quality on a first beam failure detection-reference signal (BFD-RS) that is a first CSI-RS transitions at a time t to being configured to evaluate a downlink beam quality on a second BFD-RS that is a second CSI-RS. The first CSI-RS is associated or quasi-co-located (QCLed) with a first TCI state of a first CORESET of the UE that is active before the transition time t, and the second CSI-RS is associated or QCLed with a second TCI state of the first CORESET of the UE that is active after the transition time t. 3GPP TS 38.133 fails to indicate a UE behavior for handling BFD-RS evaluation during a period that includes a transition from one active TCI state to another. A solution to this problem is now presented.

For a case as shown in FIG. 6, the active TCI state changes for the CORESET. If a CSI-RS is used as BFD-RS, and if each of the new CSI-RS for BFD and the old CSI-RS for BFD are associated or QCLed with the different active TCI state of the same CORESET, then it may be desired for the UE to drop the old CSI-RS evaluation and start the evaluation based on the new CSI-RS. When the UE transitions from a first configuration of CSI-RS that is associated or QCLed with an old active TCI state of the CORESET to a second configuration of CSI-RS associated or QCLed with a new active TCI state of the CORESET, for each CSI-RS for BFD present in the second configuration, the UE may use an evaluation period corresponding to the second configuration from the time of transition.

Before the transition time t, the UE is configured to use an evaluation period having a first duration for evaluating the downlink beam quality on the first BFD-RS, and after the transition time t, the UE is configured to use an evaluation period having a second duration for evaluating the downlink beam quality on the second BFD-RS. The second duration may be the same as, or may be longer or shorter than, the first duration. For each of the evaluation periods having the first duration, the UE is configured to estimate the downlink beam quality on the first BFD-RS over the evaluation period based on samples of the first BFD-RS (e.g., received signal power) taken during the evaluation period.

The UE is configured to begin, at the transition time t, an evaluation period having the second duration for evaluating the downlink beam quality on the second BFD-RS. The UE is configured to estimate the downlink beam quality on the second BFD-RS over this evaluation period based on samples of the second BFD-RS (e.g., received signal power) taken after transition time t. Any samples of the first BFD-RS that were taken during an evaluation period in progress at the transition time t are not used to estimate the downlink beam quality on the second BFD-RS during this evaluation period having the second duration. For example, the UE may drop such measurements.

Figure 7:
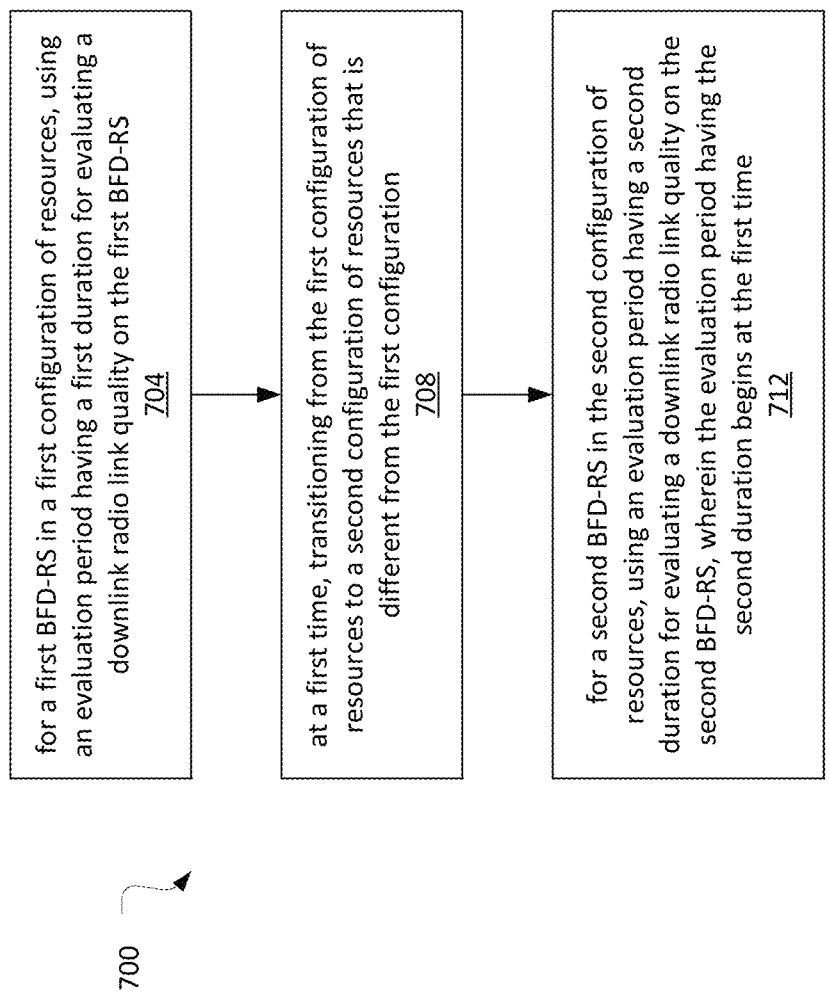
FIG. 7 illustrates an operational flow/algorithmic structure in accordance with some embodiments.

FIG. 7 illustrates an operation flow/algorithmic structure 700 in accordance with some embodiments. The operation flow/algorithmic structure 700 may be performed or implemented by a UE such as, for example, UE 104 or UE 1500; or components thereof, for example, baseband processor 1504A.

The operation flow/algorithmic structure 700 may include, at 704, for a first BFD-RS in a first configuration of resources, using an evaluation period having a first duration for evaluating a downlink beam quality on the first BFD-RS. The first BFD-RS may comprise a first CSI-RS.

The operation flow/algorithmic structure 700 may further include, at 708, at a first time, transitioning from the first configuration of resources to a second configuration of resources that is different from the first configuration. The transitioning may include changing an active TCI state of a CORESET of the UE from a first TCI state to a second TCI state that is different than the first TCI state.

The operation flow/algorithmic structure 700 may further include, at 712, for a second BFD-RS in the second configuration of resources, using an evaluation period having a second duration for evaluating a downlink beam quality on the second BFD-RS, wherein the evaluation period having the second duration begins at the first time. The second BFD-RS may comprise a second CSI-RS that is different than the first CSI-RS.

Figure 8:
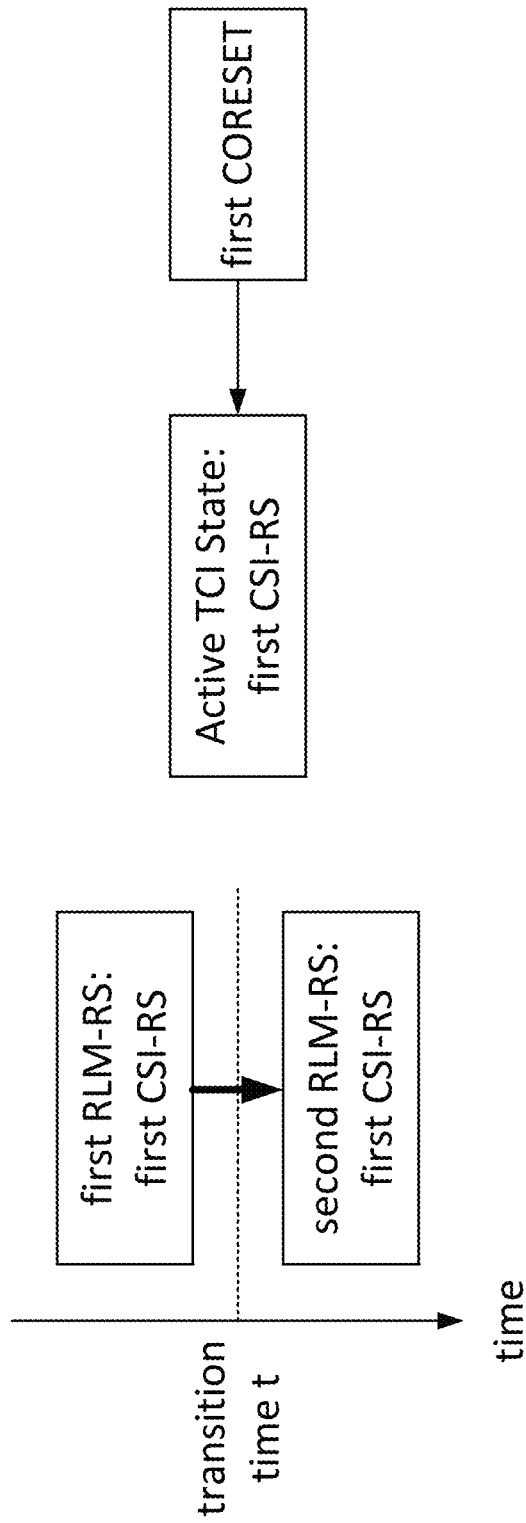
FIG. 8 shows an example of a transition from one radio link monitoring-reference signal configuration to another.

In another example, a network may signal a change in an operating state of a UE by signaling a change in a configuration of RLM resources. FIG. 8 shows an example in which a UE is configured to evaluate a downlink radio link quality on a first radio link monitoring-reference signal (RLM-RS) that is a first CSI-RS having a first configuration (e.g., a first periodicity). At a time t, the UE transitions to being configured to evaluate a downlink radio link quality on a second RLM-RS that is the first CSI-RS having a second configuration (e.g., a second periodicity), wherein the active TCI state of a first CORESET of the UE is the same before and after the transition time t.

Section 8.1.4 of 3GPP TS 38.133 states that
"When the UE transitions from a first configuration of RLM resources to a second configuration of RLM resources that is different from the first configuration, for each RLM resource present in the second configuration, for a duration of time equal to the evaluation period corresponding to the second configuration after the transition occurs, the UE shall use an evaluation period that is no less than the minimum of evaluation periods corresponding to the first configuration and the second configuration. Subsequent to this duration, the UE shall use an evaluation period corresponding to the second configuration for each RLM resource present in the second configuration. This requirement shall be applied to both out-of-sync evaluation and in-sync evaluation of the monitored cell."

In a case as shown in FIG. 8, the RLM reconfiguration may be associated with the same CORESET, and the active TCI state is unchanged for the CORESET. The reconfiguration may change the RS periodicity, and therefore the UE may need to change its evaluation period for the new RS or new configuration. For example, if CSI-RS is used as RLM-RS, and if the CSI-RS periodicity/offset is reconfigured, the evaluation window could be mixed old CSI-RS configuration and new CSI-RS configuration, and a longer evaluation period may be assumed.

A network may signal a change in an operating state of a UE by signaling a change in an offset and/or a periodicity of a reference signal. A reference signal may be shared by a group of UEs (e.g., rather than being allocated to a single UE), and it may be desired for the network to vary a timing of a reference signal (e.g., offset and/or periodicity) in response to time-varying factors such as, for example, the number of UEs currently using the reference signal, the number of UEs currently relying on the reference signal, a current traffic load, etc. Additionally or alternatively, it may be desired for a network to reduce its power consumption by, for example, increasing a periodicity of a reference signal.

Figure 9:
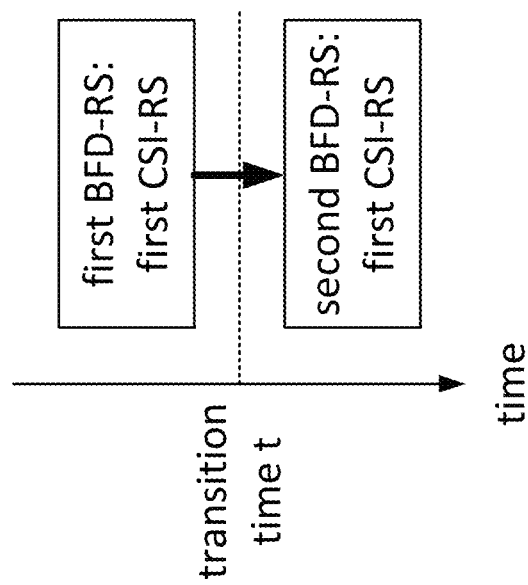
FIG. 9 shows an example of a transition from one beam failure detection-reference signal configuration to another.

FIG. 9 shows an example in which a UE is configured to evaluate a downlink beam quality on a first BFD-RS that is a first CSI-RS having a first configuration (e.g., a first offset and/or a first periodicity). At a time t, the UE transitions to being configured to evaluate a downlink beam quality on a second BFD-RS that is the first CSI-RS having a second configuration (e.g., a second offset that is different from the first offset and/or a second periodicity that is different from the first periodicity). 3GPP TS 38.133 fails to indicate a behavior for a UE upon a transition from one BFD-RS configuration (e.g., offset and/or periodicity of a CSI-RS) to another, which may result in a change to a corresponding BFD evaluation period duration.

For a case as shown in FIG. 9, the active TCI state is unchanged for the CORESET. If a CSI-RS is used as BFD-RS, and if the CSI-RS periodicity/offset is reconfigured, the evaluation window may be a mixture of the old CSI-RS configuration and the new CSI-RS configuration, and a longer evaluation period may be assumed.

Figure 10:
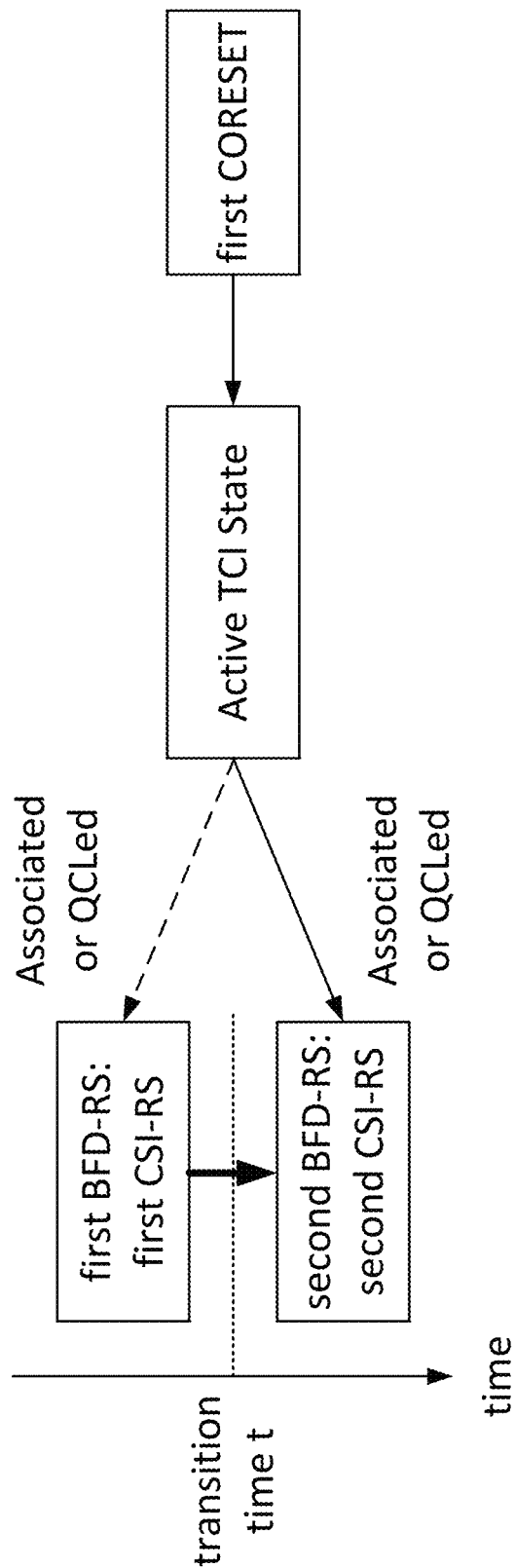
FIG. 10 shows an example of a transition from one beam failure detection-reference signal to another.

FIG. 10 shows another example in which a UE is configured to evaluate a downlink beam quality on a first BFD-RS that is a first CSI-RS. At a time t, the UE transitions to being configured to evaluate a downlink beam quality on a second BFD-RS that is a second CSI-RS different than the first CSI-RS. The active TCI state of a first CORESET of the UE is the same before and after the transition time t, and each of the first CSI-RS and the second CSI-RS are associated with (e.g., specified by) or QCLed with the active TCI state. 3GPP TS 38.133 fails to indicate a behavior for a UE upon such a transition from a BFD-RS that is a first CSI-RS to a BFD-RS that is a different CSI-RS.

For a case as shown in FIG. 10, the active TCI state is unchanged for the CORESET. If a CSI-RS is used as BFD-RS, and if the CSI-RS is reconfigured from a first CSI-RS to a second CSI-RS, with each of the first and second CSI-RS being associated or QCLed with the same active TCI state of a CORESET, the behavior of the UE for the transition is uncertain.

Solutions to these problems are now presented. For a case as shown in FIG. 9, when the UE transitions from a first configuration of BFD resources to a second configuration of BFD resources that is different from the first configuration, for each BFD resource present in the second configuration, for a duration of time equal to the evaluation period corresponding to the second configuration after the transition occurs, the UE may use an evaluation period that is no less than the minimum of evaluation periods corresponding to the first configuration and the second configuration. Subsequent to this duration, the UE may use an evaluation period corresponding to the second configuration for each BFD resource present in the second configuration.

For a case as shown in FIG. 10, when the UE transitions from a first configuration of BFD resources to a second configuration of BFD resources that is different from the first configuration, for each BFD resource present in the second configuration, for a duration of time equal to the evaluation period corresponding to the second configuration after the transition occurs, the UE may use an evaluation period that is no less than the minimum of evaluation periods corresponding to the first configuration and the second configuration if the first and second configuration of BFD are associated or QCLed with the same active TCI state of the CORESET. Subsequent to this duration, the UE may use an evaluation period corresponding to the second configuration for each BFD resource present in the second configuration.

Before the transition time t, the UE is configured to use an evaluation period having a first duration for evaluating the downlink beam quality on the first BFD-RS, and after the transition time t, the UE is configured to use an evaluation period having a second duration for evaluating the downlink beam quality on the second BFD-RS. The second duration may be the same as, or may be longer or shorter than, the first duration. For each of the evaluation periods having the first duration and the evaluation periods having the second duration, the UE is configured to estimate the downlink beam quality on the first BFD-RS over the evaluation period based on samples of the first BFD-RS (e.g., received signal power) taken during the evaluation period.

At the transition time t, the UE is configured to use a mixed evaluation period for evaluating the downlink beam quality on the first BFD-RS and the second BFD-RS. This evaluation period begins prior to the transition time t (e.g., at the start of the ongoing evaluation period having the first duration) and ends after the transition time t (e.g., at the time equal to the second duration after transition time t). The UE is configured to estimate the downlink beam quality on the first BFD-RS and the second BFD-RS over the mixed evaluation period based on samples of the first BFD-RS and samples of the second BFD-RS (e.g., received signal power) taken during the mixed evaluation period (e.g., based on samples of the first BFD-RS taken before transition time t and on samples of the second BFD-RS taken after transition time t).

Figure 11:
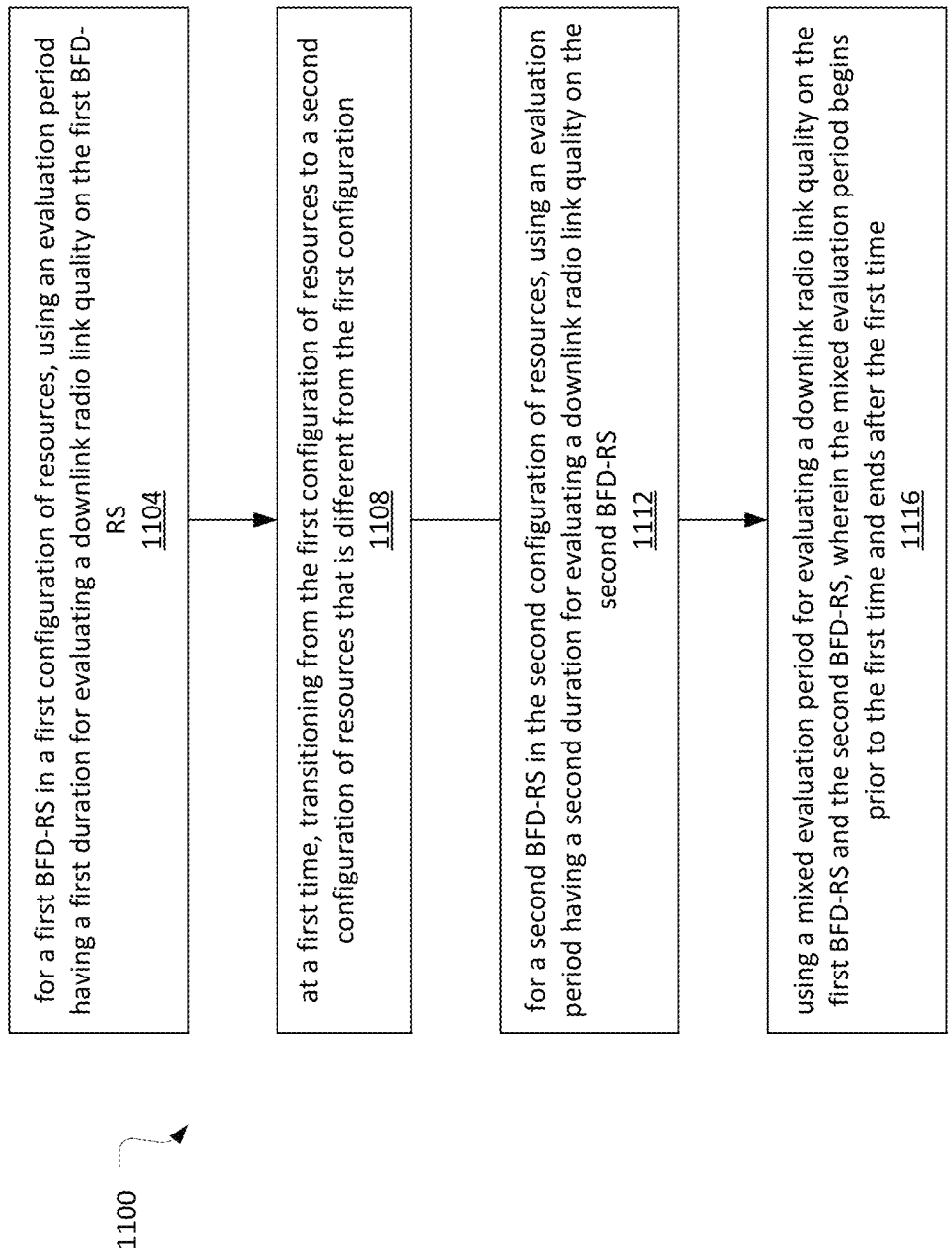
FIG. 11 illustrates an operational flow/algorithmic structure in accordance with some embodiments.

FIG. 11 illustrates an operation flow/algorithmic structure 1100 in accordance with some embodiments. The operation flow/algorithmic structure 1100 may be performed or implemented by a UE such as, for example, UE 104 or UE 1500; or components thereof, for example, baseband processor 1504A.

The operation flow/algorithmic structure 1100 may include, at 1104, for a first BFD-RS in a first configuration of resources, using an evaluation period having a first duration for evaluating a downlink beam quality on the first BFD-RS. The first BFD-RS may comprise a first CSI-RS.

The operation flow/algorithmic structure 1100 may further include, at 1108, at a first time, transitioning from the first configuration of resources to a second configuration of resources that is different from the first configuration. The transitioning may include changing a configuration of the first CSI-RS and/or changing the first BFD-RS to a different CSI-RS.

The operation flow/algorithmic structure 1100 may further include, at 1112, for a second BFD-RS in the second configuration of resources, using an evaluation period having a second duration for evaluating a downlink beam quality on the second BFD-RS. The second BFD-RS may comprise the first CSI-RS, or may comprise a second CSI-RS that is different than the first CSI-RS and is indicated by the active TCI state of the CORESET of the UE to be QCLed with the active TCI state. If the second CSI-RS comprises the first CSI-RS, then an offset of the first CSI-RS before the first time may be different than the offset of the first CSI-RS after the first time, and/or a periodicity of the first CSI-RS before the first time may be different than the periodicity of the first CSI-RS after the first time.

The operation flow/algorithmic structure 1100 may further include, at 1116, use a mixed evaluation period for evaluating a downlink beam quality on the first BFD-RS and the second BFD-RS. The mixed evaluation period may begin prior to the first time and may end after the first time. The active TCI state of the CORESET of the UE may remain unchanged during the mixed evaluation period.

Both of an evaluation period having the first duration that is adjacent to the mixed evaluation period and an evaluation period having the second duration that is adjacent to the mixed evaluation period may be in-sync evaluation periods. Alternatively, both of an evaluation period having the first duration that is adjacent to the mixed evaluation period and an evaluation period having the second duration that is adjacent to the mixed evaluation period may be out-of-sync evaluation periods. The operation flow/algorithmic structure 1100 may further include using evaluation samples based on the first BFD-RS for evaluating the downlink beam quality on the first BFD-RS and the second BFD-RS and/or using evaluation samples taken before the first time for evaluating the downlink beam quality on the first BFD-RS and the second BFD-RS.

Figure 12:
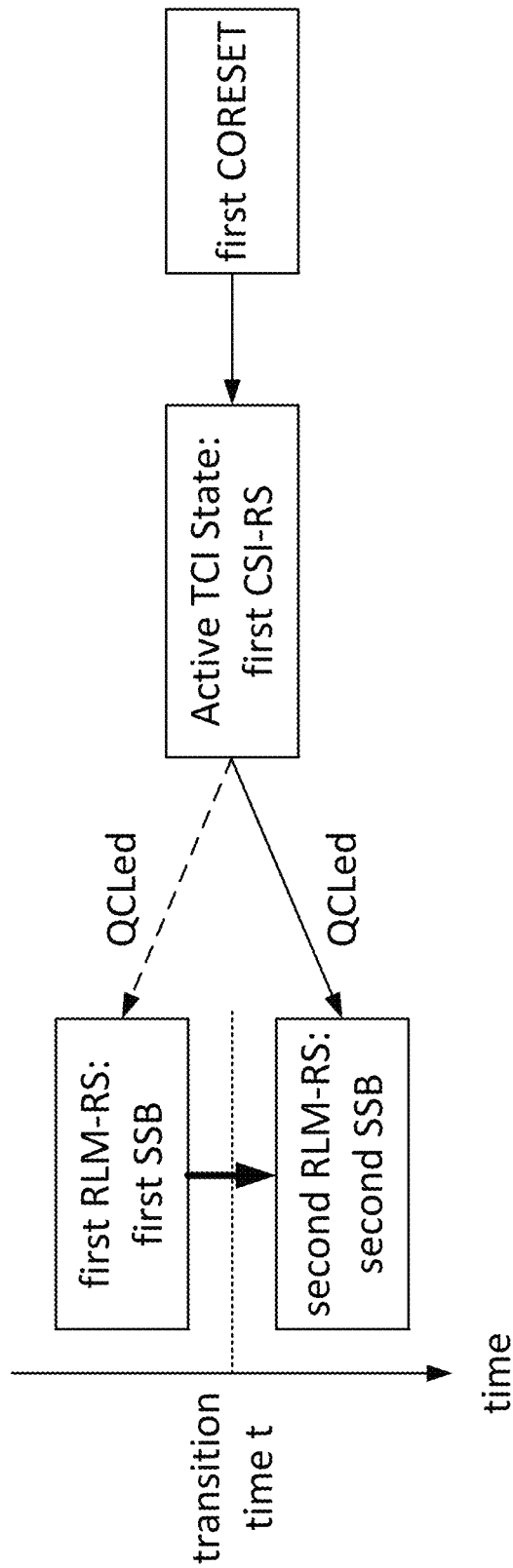
FIG. 12 shows an example of a transition from one radio link monitoring-reference signal to another.

In another example, a network may signal a change in an operating state of a UE by signaling a change of an RLM-RS or BFD-RS from one SSB to another. FIG. 12 shows an example in which a UE is configured to evaluate a downlink radio link quality on a first RLM-RS that is a first SSB. At a time t, the UE transitions to being configured to evaluate a downlink radio link quality on a second RLM-RS that is a second SSB, wherein the active TCI state of a first CORESET of the UE is the same before and after the transition time t, and both of the first SSB and the second SSB are QCLed with the active TCI state.

In a case as shown in FIG. 12, the active TCI state is unchanged for the CORESET. If an SSB is used as RLM-RS, and if the RLM-RS is configured from one SSB to another SSB, but the active TCI state of any CORESET is not changed, the behavior of the UE for the transition is uncertain. For example, the active TCI state is QCLed with the old SSB before the transition, and the active TCI state is also QCLed with the new SSB after the transition.

Figure 13:
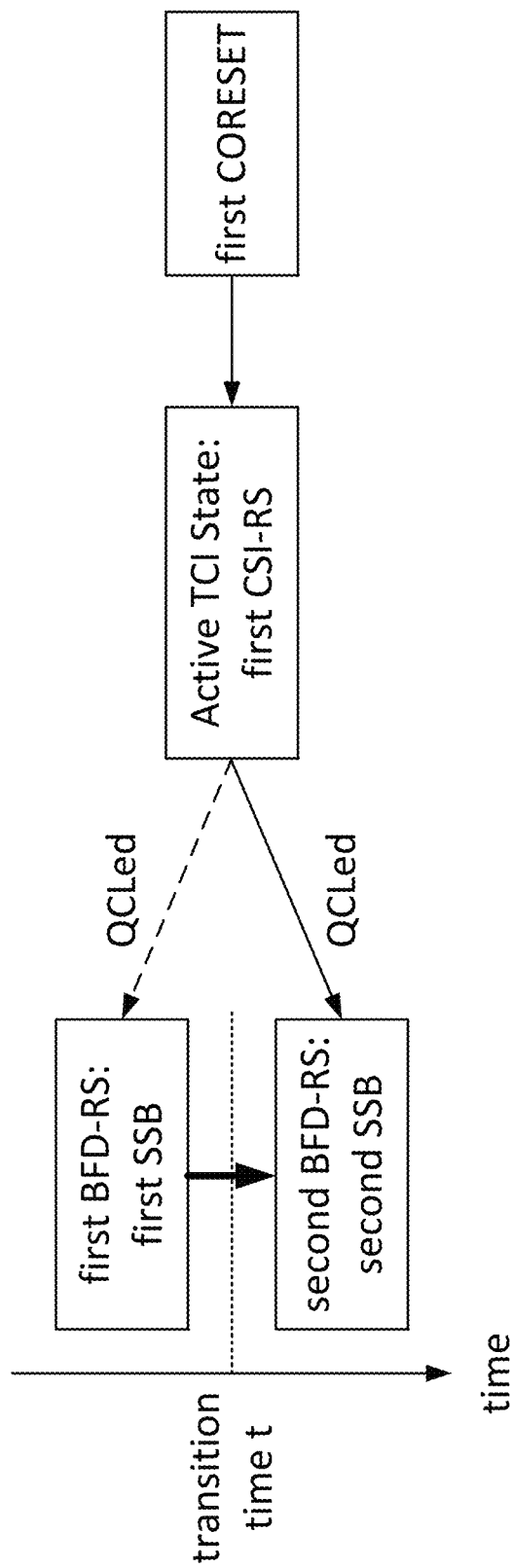
FIG. 13 shows an example of a transition from one beam failure detection-reference signal to another.

FIG. 13 shows an example in which a UE is configured to evaluate a downlink beam quality on a first BFD-RS that is a first SSB. At a time t, the UE transitions to being configured to evaluate a downlink beam quality on a second BFD-RS that is a second SSB, wherein the active TCI state of a first CORESET of the UE is the same before and after the transition time t, and both of the first SSB and the second SSB are QCLed with the active TCI state.

For a case as shown in FIG. 13, the active TCI state is unchanged for the CORESET. If an SSB is used as BFD-RS, and if the BFD-RS is configured from one SSB to another SSB, but the active TCI state of any CORESET is not changed, the behavior of the UE for the transition is uncertain.

3GPP TS 38.133 fails to indicate a desired UE behavior for handling RLM-RS evaluation or BFD-RS evaluation during a period that includes a transition of the monitored RS from one SSB to another (e.g., as shown in FIGS. 12 and 13).

Figure 14A:
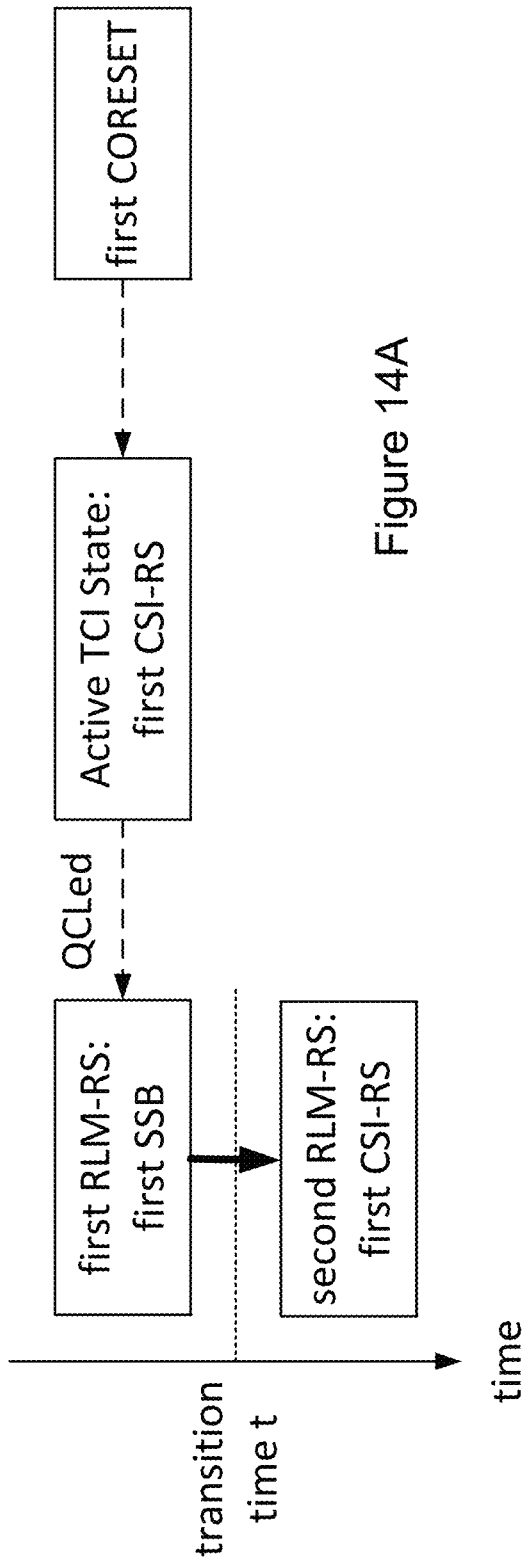
FIG. 14A shows an example of a transition from one radio link monitoring-reference signal to another.
Figure 14B:
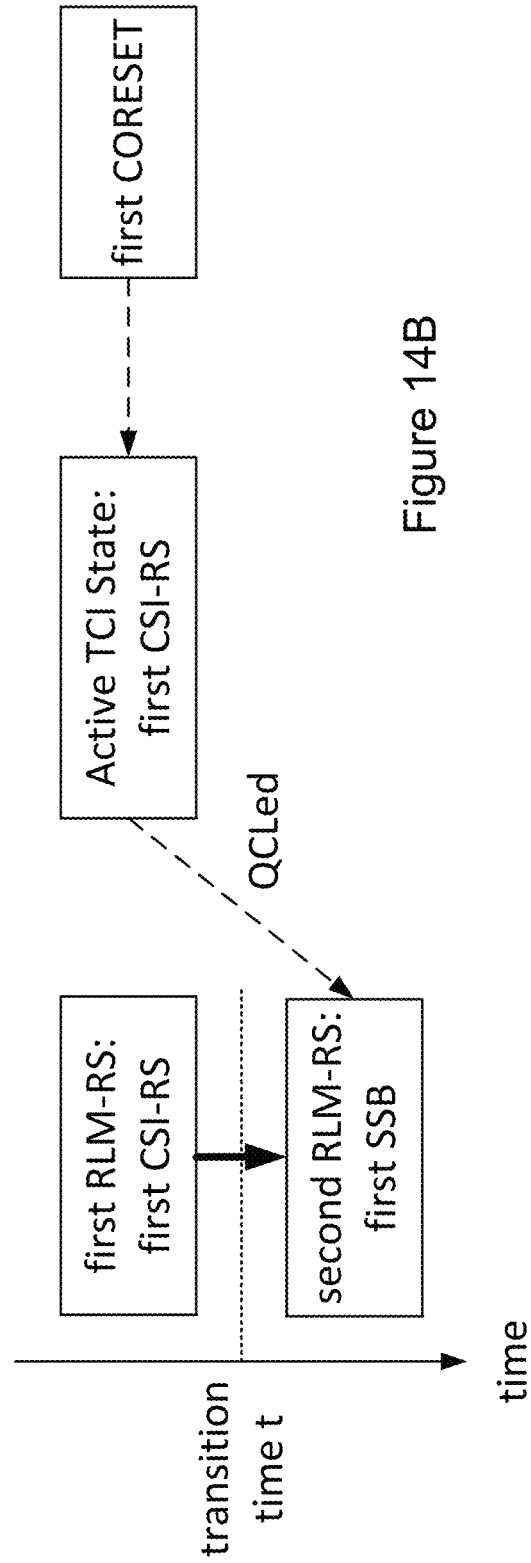
FIG. 14B shows an example of a transition from one radio link monitoring-reference signal to another.

In a further example, a network may signal a change in an operating state of a UE by signaling a change of an RLM-RS or BFD-RS from a CSI-RS that is specified by the active TCI state of a CORESET of the UE to an SSB that is QCLed with the active TCI state, or vice versa. FIG. 14A shows an example in which a UE is configured to evaluate a downlink radio link quality on a first RLM-RS that is a first SSB which is QCLed with the active TCI state of a first CORESET of the UE. At a time t, the UE transitions to being configured to evaluate a downlink radio link quality on a second RLM-RS that is a first CSI-RS, wherein the active TCI state of a first CORESET of the UE is the same before and after the transition time t, and the active TCI state specifies the first CSI-RS. FIG. 14B shows a similar example in which a UE is configured to evaluate a downlink radio link quality on a first RLM-RS that is a first CSI-RS specified by the active TCI state of a first CORESET of the UE. At a time t, the UE transitions to being configured to evaluate a downlink radio link quality on a second RLM-RS that is a first SSB which is QCLed with the active TCI state, which is the same before and after the transition time t.

In cases as shown in FIGS. 14A and 14B, the active TCI state is unchanged for the CORESET. If the RLM-RS is changed from SSB to CSI-RS (FIG. 14A), or is changed from CSI-RS to SSB (FIG. 14B), the CSI-RS here is in the active TCI state of the CORESET. In these cases, the active TCI state is not changed, but the RLM-RS is changed, and the behavior of the UE for the transition is uncertain. For example, the active TCI state is QCLed with the above SSB, and the above CSI-RS is in this active TCI state (not changed before and after the transition).

Figure 15A:
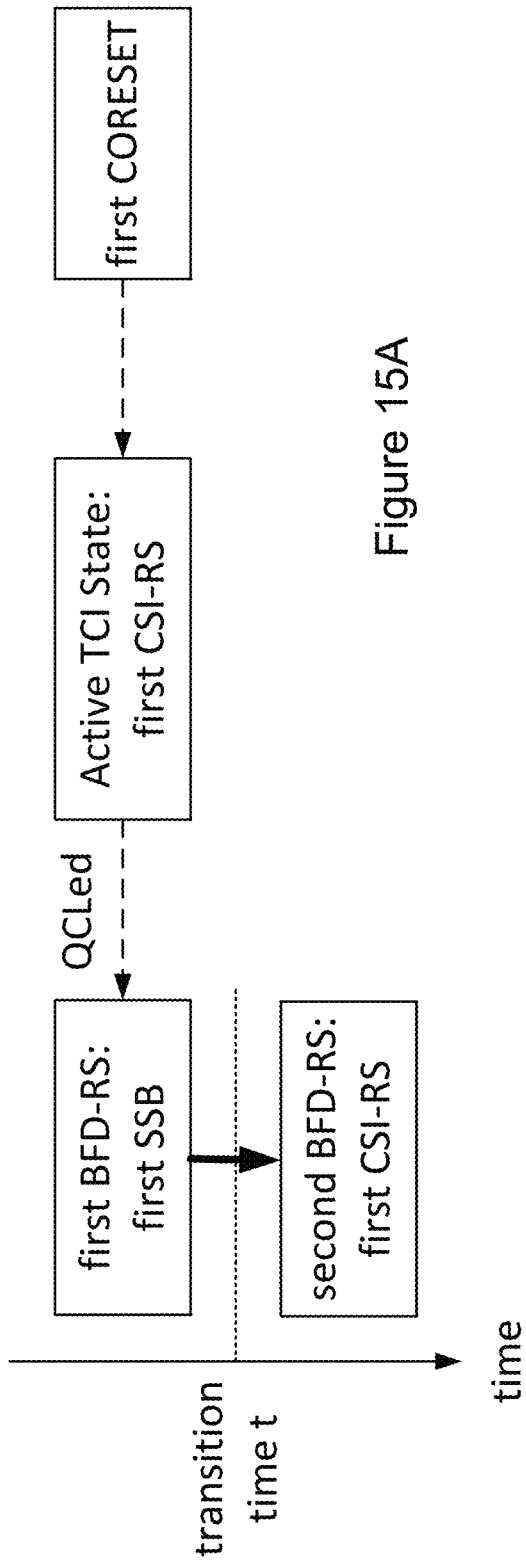
FIG. 15A shows an example of a transition from one beam failure detection-reference signal to another.
Figure 15B:
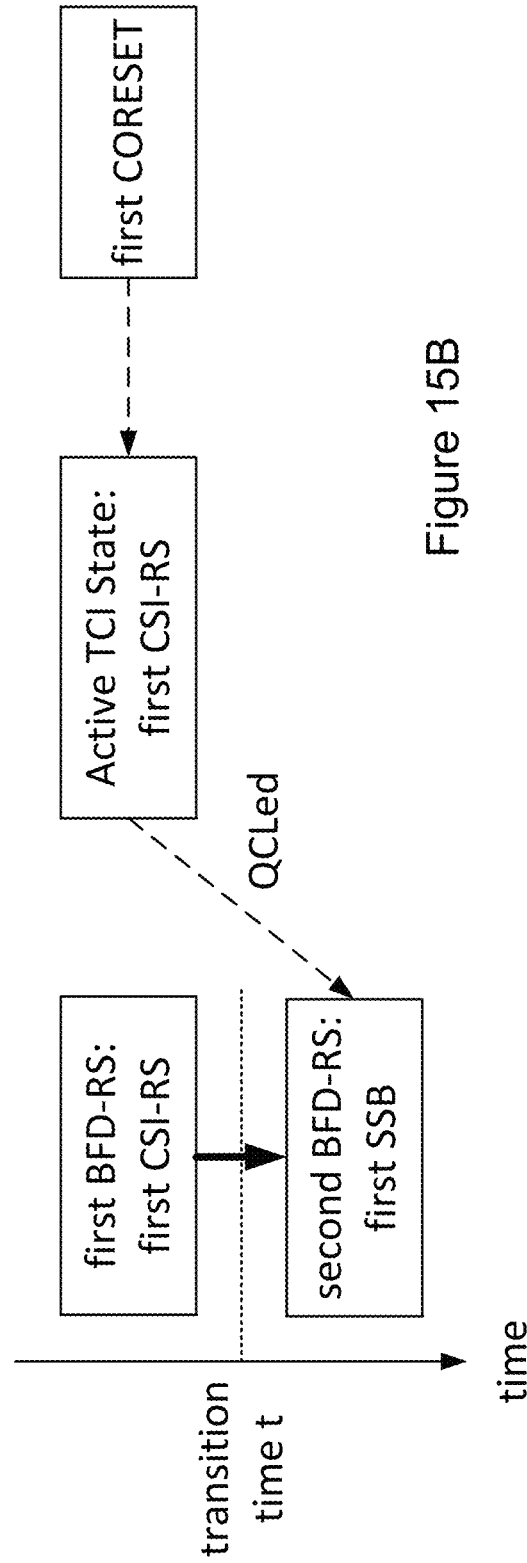
FIG. 15B shows an example of a transition from one beam failure detection-reference signal to another.

FIG. 15A shows an example in which a UE is configured to evaluate a downlink beam quality on a first BFD-RS that is a first SSB which is QCLed with the active TCI state of a first CORESET of the UE. At a time t, the UE transitions to being configured to evaluate a downlink beam quality on a second BFD-RS that is a first CSI-RS, wherein the active TCI state of a first CORESET of the UE is the same before and after the transition time t, and the active TCI state specifies the first CSI-RS. FIG. 15B shows a similar example in which a UE is configured to evaluate a downlink beam quality on a first BFD-RS that is a first CSI-RS specified by the active TCI state of a first CORESET of the UE. At a time t, the UE transitions to being configured to evaluate a downlink beam quality on a second BFD-RS that is a first SSB which is QCLed with the active TCI state, which is the same before and after the transition time t.

In cases as shown in FIGS. 15A and 15B, the active TCI state is unchanged for the CORESET. If the BFD-RS is changed from SSB to CSI-RS (FIG. 15A) or is changed from CSI-RS to SSB (FIG. 15B), the CSI-RS here is associated or QCLed with the active TCI state of the CORESET. The active TCI state in this case is not changed, but the BFD-RS is changed, and the behavior of the UE for the transition is uncertain.

3GPP TS 38.133 fails to indicate a desired UE behavior for handling RLM-RS evaluation or BFD-RS evaluation during a period that includes a transition of the monitored RS from a CSI-RS specified by the active TCI state to a SSB that is QCLed with the active TCI state, or vice versa (e.g., as shown in FIGS. 14A, 14B, 15A, and 15B).

Solutions to these problems for RLM are now presented. For a case as shown in FIG. 12, when the UE transitions from one SSB as old RLM RS to another SSB as new RLM-RS, for the new SSB for RLM, the UE may use an evaluation period corresponding to the new SSB from the time of transition and UE shall drop the evaluation samples based on the old SSB. This principle may be applied to both out-of-sync evaluation and in-sync evaluation of the monitored cell, provided that 1) the old and new SSBs are QCLed with the same active TCI state of one CORESET, and 2) the active TCI state of this CORESET during this RLM-RS (SSB to SSB) transition is not changed.

For a case as shown in FIG. 14A, when the UE transitions from a first configuration of active TCI state of the CORESET to a second configuration of SSB QCLed with the active TCI state of the CORESET, for SSB for RLM-RS present in the second configuration, the UE may use an evaluation period corresponding to the second configuration from the time of transition, and the UE may drop the evaluation samples based on the CSI-RS in the old active TCI state. This principle may be applied to both out-of-sync evaluation and in-sync evaluation of the monitored cell.

For a case as shown in FIG. 14B, when the UE transitions from a first configuration of SSB QCLed with the active TCI state of the CORESET to a second configuration of active TCI state of the CORESET, for CSI-RS for RLM-RS present in the second configuration, the UE may use an evaluation period corresponding to the second configuration from the time of transition, and the UE may drop the evaluation samples based on the old SSB. This principle may be applied to both out-of-sync evaluation and in-sync evaluation of the monitored cell.

Even though the active TCI state remains unchanged in the examples shown in FIGS. 12, 14A, and 14B, the inventors have determined that evaluation of radio link quality for RLM during any time subsequent to the transition time t should not be based on samples taken before the transition time t. Accordingly, before the transition time t, the UE is configured to use an evaluation period having a first duration for evaluating the downlink radio link quality on the first RLM-RS, and after the transition time t, the UE is configured to use an evaluation period having a second duration for evaluating the downlink radio link quality on the second RLM-RS. The second duration may be the same as, or may be longer or shorter than, the first duration. For each of the evaluation periods having the first duration, the UE is configured to estimate the downlink radio link quality on the first RLM-RS over the evaluation period based on samples of the first RLM-RS (e.g., received signal power) taken during the evaluation period.

The UE is configured to begin, at the transition time t, an evaluation period having the second duration for evaluating the downlink radio link quality on the second RLM-RS. The UE is configured to estimate the downlink radio link quality on the second RLM-RS over this evaluation period based on samples of the second RLM-RS (e.g., received signal power) taken after transition time t. Any samples of the first RLM-RS that were taken during an evaluation period in progress at the transition time t are not used to estimate the downlink radio link quality on the second RLM-RS during this evaluation period having the second duration. For example, the UE may drop such measurements.

Solutions to these problems for BFD are now presented. For a case as shown in FIG. 13, when the UE transitions from one SSB as old BFD RS to another SSB as new BFD-RS, for the new SSB for BFD, the UE may use an evaluation period corresponding to the new SSB from the time of transition, and the UE may drop the evaluation samples based on the old SSB, provided that 1) the above old and new SSBs are QCLed with the same active TCI state of one CORESET and 2) the active TCI state of this CORESET during this BFD-RS (SSB to SSB) transition is not changed.

For a case as shown in FIG. 15A, when the UE transitions from a first configuration of active TCI state of the CORE-SET to a second configuration of SSB QCLed with the active TCI state of the CORESET, for SSB for BFD present in the second configuration, the UE may use an evaluation period corresponding to the second configuration from the time of transition, and the UE may drop the evaluation samples based on the CSI-RS in the old active TCI state.

For a case as shown in FIG. 15B, when the UE transitions from a first configuration of SSB QCLed with the active TCI state of the CORESET to a second configuration of active TCI state of the CORESET, for CSI-RS for BFD present in the second configuration, the UE may use an evaluation period corresponding to the second configuration from the time of transition, and the UE may drop the evaluation samples based on the old SSB.

Even though the active TCI state remains unchanged in the examples shown in FIGS. 13, 15A, and 15B, the inventors have determined that evaluation of beam quality for BFD during any time subsequent to the transition time t should not be based on samples taken before the transition time t. Accordingly, before the transition time t, the UE is configured to use an evaluation period having a first duration for evaluating the downlink beam quality on the first BFD-RS, and after the transition time t, the UE is configured to use an evaluation period having a second duration for evaluating the downlink beam quality on the second BFD-RS. The second duration may be the same as, or may be longer or shorter than, the first duration. For each of the evaluation periods having the first duration, the UE is configured to estimate the downlink beam quality on the first BFD-RS over the evaluation period based on samples of the first BFD-RS (e.g., received signal power) taken during the evaluation period.

The UE is configured to begin, at the transition time t, an evaluation period having the second duration for evaluating the downlink beam quality on the second BFD-RS. The UE is configured to estimate the downlink beam quality on the second BFD-RS over this evaluation period based on samples of the second BFD-RS (e.g., received signal power) taken after transition time t. Any samples of the first BFD-RS that were taken during an evaluation period in progress at the transition time t are not used to estimate the downlink beam quality on the second BFD-RS during this evaluation period having the second duration. For example, the UE may drop such measurements.

Figure 16:
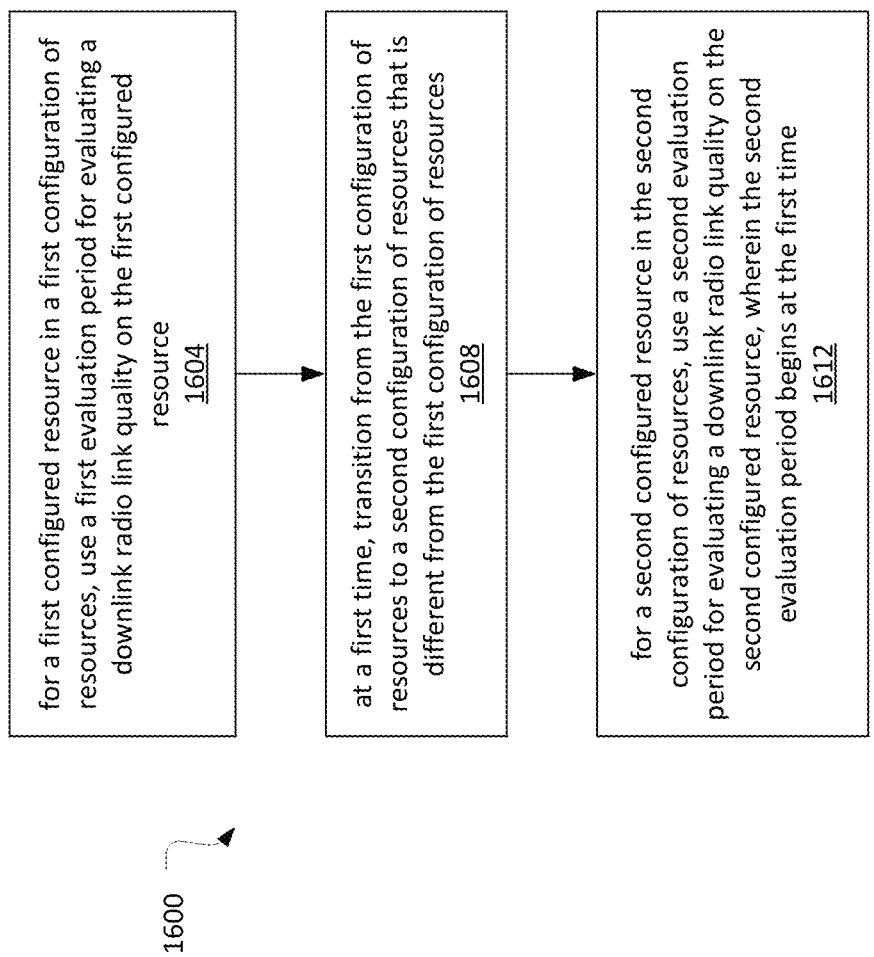
FIG. 16 illustrates an operational flow/algorithmic structure in accordance with some embodiments.

FIG. 16 illustrates an operation flow/algorithmic structure 1600 in accordance with some embodiments. The operation flow/algorithmic structure 1600 may be performed or implemented by a UE such as, for example, UE 104 or UE 1500; or components thereof, for example, baseband processor 1504A.

The operation flow/algorithmic structure 1600 may include, at 1604, for a first configured resource in a first configuration of resources, using a first evaluation period for evaluating a downlink radio link quality on the first configured resource.

The operation flow/algorithmic structure 1600 may further include, at 1608, at a first time, transitioning from the first configuration of resources to a second configuration of resources that is different from the first configuration. Both of the first configured resource and the second configured resource may be configured for RLM. Alternatively, both of the first configured resource and the second configured resource may be configured for BFD, and the downlink radio link quality may be a downlink beam quality.

A TCI state of a CORESET of the UE may indicate that a first SSB is quasi-co-located with the CORESET, and a first one of the first configured resource and the second configured resource may comprise the first SSB. A second one of the first configured resource and the second configured resource may comprise a second SSB that is different than the first SSB, wherein the active TCI State of the CORESET indicates that the second SSB is quasi-co-located with the CORESET. Alternatively, the second one of the first configured resource and the second configured resource may comprise a channel state information reference signal (CSI-RS) that is specified by the active TCI state.

The operation flow/algorithmic structure 1600 may further include, at 1612, for a second configured resource in the second configuration of resources, using a second evaluation period for evaluating a downlink radio link quality on the second configured resource, wherein the second evaluation period begins at the first time. Both of an evaluation period having the first duration that ends prior to the first time and the evaluation period having the second duration may be in-sync evaluation periods. Alternatively, both of an evaluation period having the first duration that ends prior to the first time and the evaluation period having the second duration may be out-of-sync evaluation periods. Using the second evaluation period for evaluating a downlink radio link quality on the second configured resource may include dropping evaluation samples based on the first configured resource. Using the second evaluation period for evaluating a downlink radio link quality on the second configured resource may include dropping evaluation samples taken before the first time.

Figure 17:
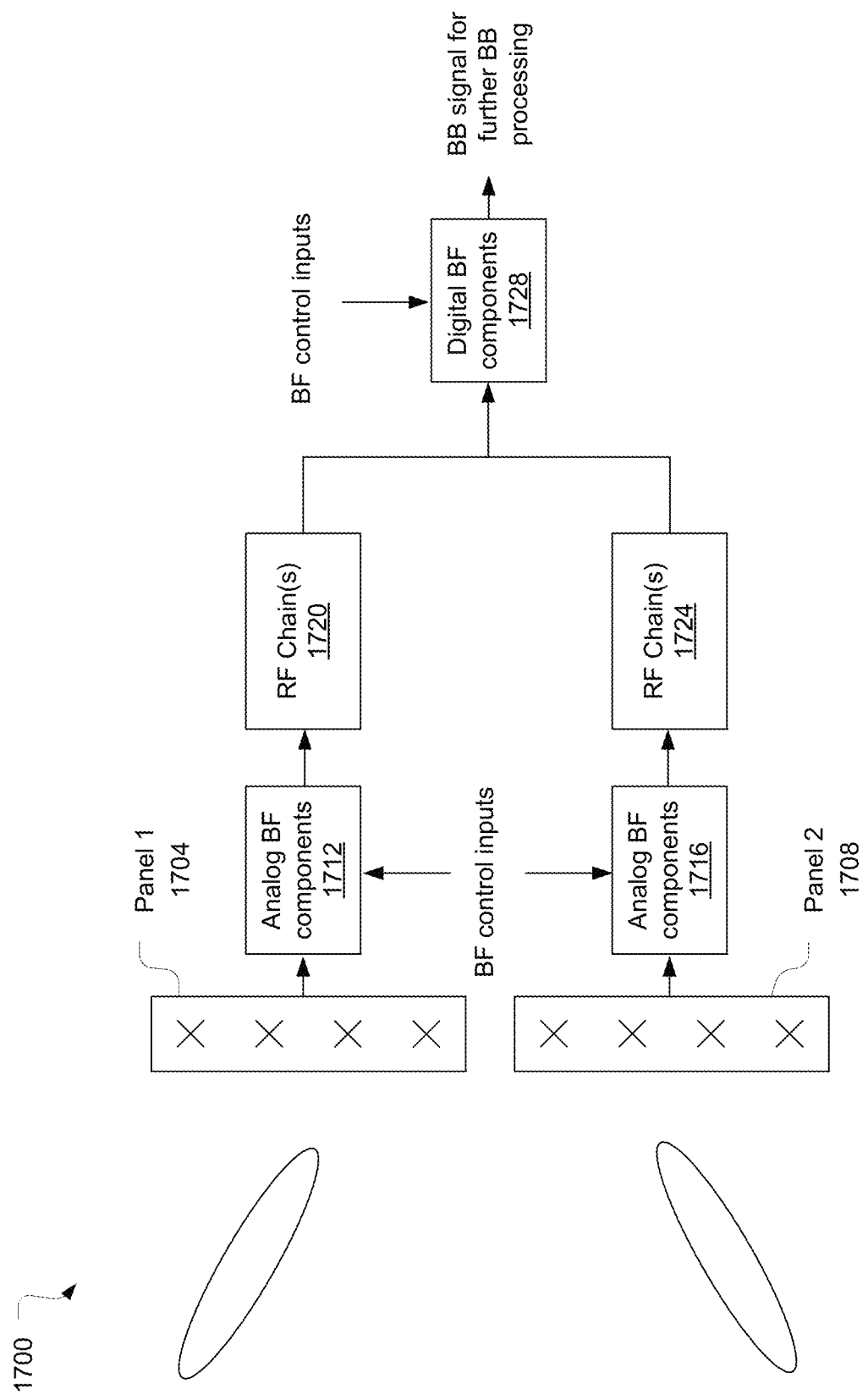
FIG. 17 illustrates beamforming components of a device in accordance with some embodiments.

FIG. 17 illustrates receive components 1700 of a device in accordance with some embodiments. The device may be the UE 104 or serving cell 112, 114, 212, 214, 216, or 218. The receive components 1700 may include a first antenna panel, panel 1 1704, and a second antenna panel, panel 2 1708. Each antenna panel may include a number of antenna elements.

The antenna panels may be coupled to respective analog beamforming (BF) components. For example, panel 1 1704 may be coupled with analog BF components 1712 and panel 2 1708 may be coupled with analog BF components 1716.

The analog BF components may be coupled with one or more radio-frequency (RF) chains. For example, analog BF components 1712 may be coupled with one or more RF chains 1720 and analog BF components 1716 may be coupled with one or more RF chains 1724. The RF chains may amplify a receive analog RF signal, downconvert the RF signal to baseband, and convert the analog baseband signal to a digital baseband signal, which may be provided to digital BF components 1728. The digital BF components 1728 may provide a baseband (BB signal) for further BB processing.

In various embodiments, control circuitry, which may reside in a baseband processor, may provide BF weights to the analog/digital BF components to provide a receive beam at respective antenna panels. These BF weights may be determined by the control circuitry based on received reference signals and corresponding QCL/TCI information as described herein. In some embodiments, the BF weights may be phase-shift values provided to phase shifters of the analog BF components 1712 or complex weights provided to the digital BF components 1728. In some embodiments, the BF components and antenna panels may operate together to provide a dynamic phased-array that is capable of directing the beams in the desired direction.

In various embodiments, beamforming may include analog, only digital, or a hybrid analog-digital beamforming. Digital beamforming may utilize separate RF chains that respectively correspond to the antenna elements.

While the beamforming components 1700 describe receive beamforming, other embodiments may include beamforming components that perform transmit beamforming in analogous manners.

Figure 18:
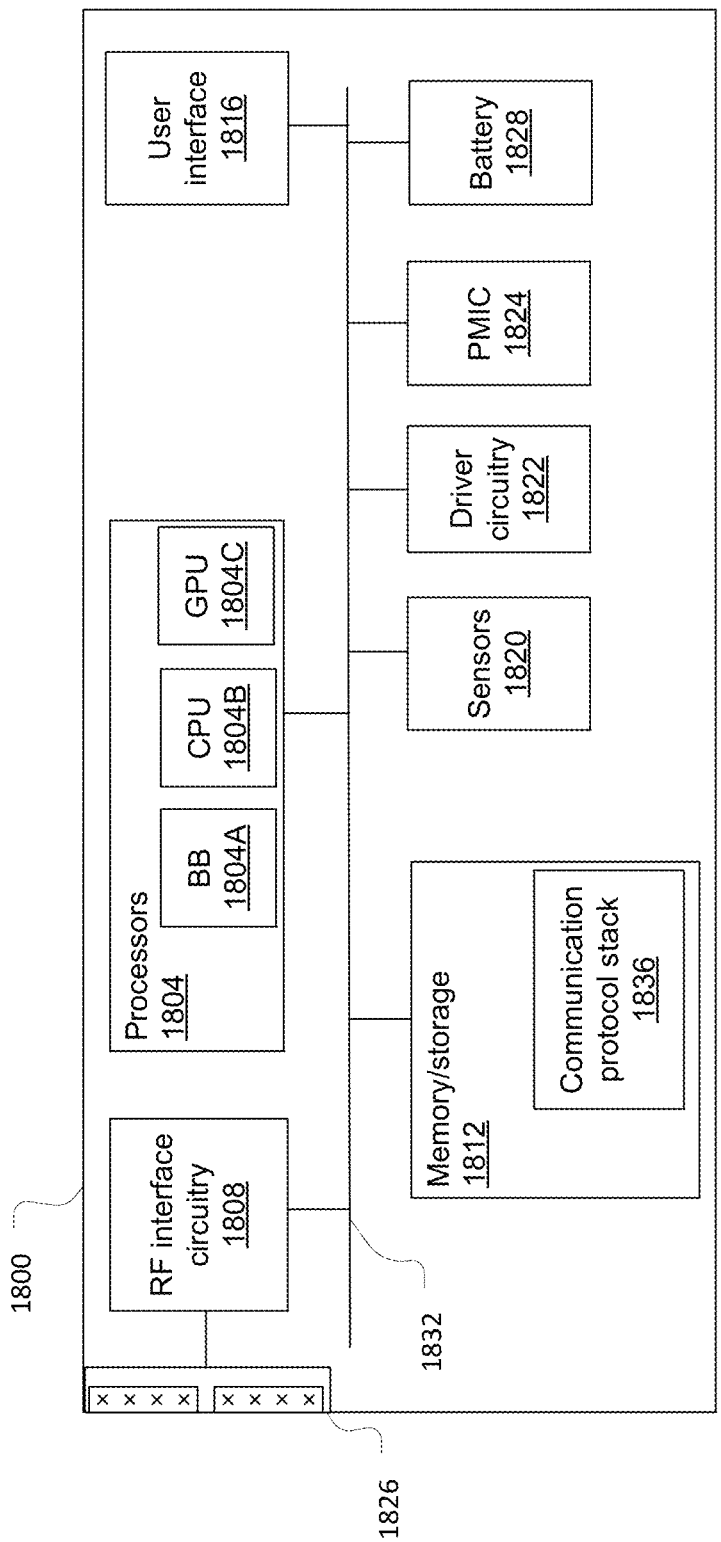
FIG. 18 illustrates a user equipment in accordance with some embodiments.

FIG. 18 illustrates a UE 1800 in accordance with some embodiments. The UE 1800 may be similar to and substantially interchangeable with UE 104 of FIGS. 1 and 2.

The UE 1800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1800 may include processors 1804, RF interface circuitry 1808, memory/storage 1812, user interface 1816, sensors 1820, driver circuitry 1822, power management integrated circuit (PMIC) 1824, antenna structure 1826, and battery 1828. The components of the UE 1800 may be implemented as integrated circuits (ICs), portions thereof, discrete electronic devices, or other modules, logic, hardware, software, firmware, or a combination thereof. The block diagram of FIG. 18 is intended to show a high-level view of some of the components of the UE 1800. However, some of the components shown may be omitted, additional components may be present, and different arrangement of the components shown may occur in other implementations.

The components of the UE 1800 may be coupled with various other components over one or more interconnects 1832, which may represent any type of interface, input/output, bus (local, system, or expansion), transmission line, trace, optical connection, etc. that allows various circuit components (on common or different chips or chipsets) to interact with one another.

The processors 1804 may include processor circuitry such as, for example, baseband processor circuitry (BB) 1804A, central processor unit circuitry (CPU) 1804B, and graphics processor unit circuitry (GPU) 1804C. The processors 1804 may include any type of circuitry or processor circuitry that executes or otherwise operates computer-executable instructions, such as program code, software modules, or functional processes from memory/storage 1812 to cause the UE 1800 to perform operations as described herein.

In some embodiments, the baseband processor circuitry 1804A may access a communication protocol stack 1836 in the memory/storage 1812 to communicate over a 3GPP compatible network. In general, the baseband processor circuitry 1804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1808.

The baseband processor circuitry 1804A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1812 may include one or more non-transitory, computer-readable media that includes instructions (for example, communication protocol stack 1836) that may be executed by one or more of the processors 1804 to cause the UE 1800 to perform various operations described herein. The memory/storage 1812 include any type of volatile or non-volatile memory that may be distributed throughout the UE 1800. In some embodiments, some of the memory/storage 1812 may be located on the processors 1804 themselves (for example, L1 and L2 cache), while other memory/storage 1812 is external to the processors 1804 but accessible thereto via a memory interface. The memory/storage 1812 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1808 may include transceiver circuitry and radio frequency front module (RFEM) that allows the UE 1800 to communicate with other devices over a radio access network. The RF interface circuitry 1808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1826 and proceed to filter and amplify (with a low-noise amplifier) the signal. The signal may be provided to a receiver of the transceiver that down-converts the RF signal into a baseband signal that is provided to the baseband processor of the processors 1804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1826.

In various embodiments, the RF interface circuitry 1808 may be configured to transmit/receive signals in a manner compatible with NR access technologies.

The antenna 1826 may include antenna elements to convert electrical signals into radio waves to travel through the air and to convert received radio waves into electrical signals. The antenna elements may be arranged into one or more antenna panels. The antenna 1826 may have antenna panels that are omnidirectional, directional, or a combination thereof to enable beamforming and multiple input, multiple output communications. The antenna 1826 may include microstrip antennas, printed antennas fabricated on the surface of one or more printed circuit boards, patch antennas, phased array antennas, etc. The antenna 1826 may have one or more panels designed for specific frequency bands including bands in FR1 or FR2.

The user interface circuitry 1816 includes various input/output (I/O) devices designed to enable user interaction with the UE 1800. The user interface 1816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1800.

The sensors 1820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1822 may include software and hardware elements that operate to control particular devices that are embedded in the UE 1800, attached to the UE 1800, or otherwise communicatively coupled with the UE 1800. The driver circuitry 1822 may include individual drivers allowing other components to interact with or control various input/output (I/O) devices that may be present within, or connected to, the UE 1800. For example, driver circuitry 1822 may include a display driver to control and allow access to a display device, a touchscreen driver to control and allow access to a touchscreen interface, sensor drivers to obtain sensor readings of sensor circuitry 1820 and control and allow access to sensor circuitry 1820, drivers to obtain actuator positions of electro-mechanic components or control and allow access to the electro-mechanic components, a camera driver to control and allow access to an embedded image capture device, audio drivers to control and allow access to one or more audio devices.

The PMIC 1824 may manage power provided to various components of the UE 1800. In particular, with respect to the processors 1804, the PMIC 1824 may control power-source selection, voltage scaling, battery charging, or DC-to-DC conversion.

In some embodiments, the PMIC 1824 may control, or otherwise be part of, various power saving mechanisms of the UE 1800 including DRX as discussed herein.

A battery 1828 may power the UE 1800, although in some examples the UE 1800 may be mounted deployed in a fixed location, and may have a power supply coupled to an electrical grid. The battery 1828 may be a lithium ion battery, a metal-air battery, such as a zinc-air battery, an aluminum-air battery, a lithium-air battery, and the like. In some implementations, such as in vehicle-based applications, the battery 1828 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method comprising of operating a UE, the method comprising: for a first configured resource in a first configuration of resources, using an evaluation period having a first duration for evaluating a downlink radio link quality on the first configured resource; at a first time, transitioning from the first configuration of resources to a second configuration of resources that is different from the first configuration of resources; and for a second configured resource in the second configuration of resources, using an evaluation period having a second duration for evaluating a downlink radio link quality on the second configured resource. In this Example, the evaluation period having the second duration may begin at the first time, an active TCI state of a CORESET of the UE may indicate that a first SSB is quasi-co-located with the active TCI state, and a first one of the first configured resource and the second configured resource may comprise the first SSB. In this Example, a second one of the first configured resource and the second configured resource may comprise a second SSB that is different than the first SSB, wherein the active TCI state of the CORESET indicates that the second SSB is quasi-co-located with the active TCI state, or a CSI-RS that is specified by the active TCI state of the CORESET.

Example 2 includes the method of Example 1 or some other example herein, wherein both of an evaluation period having the first duration that ends prior to the first time and the evaluation period having the second duration are in-sync evaluation periods.

Example 3 includes the method of Example 1 or some other example herein, wherein both of an evaluation period having the first duration that ends prior to the first time and the evaluation period having the second duration are out-of-sync evaluation periods.

Example 4 includes the method of any of Examples 1-3 or some other example herein, wherein both of the first configured resource and the second configured resource are configured for RLM.

Example 5 includes the method of any of Examples 1-3 or some other example herein, wherein both of the first configured resource and the second configured resource are configured for BFD, and the downlink radio link quality may be a downlink beam quality.

Example 6 includes the method of any of Examples 1-5 or some other example herein, wherein using an evaluation period having the second duration for evaluating a downlink radio link quality on the second configured resource may include dropping evaluation samples based on the first configured resource.

Example 7 includes the method of any of Examples 1-6 or some other example herein, wherein using an evaluation period having the second duration for evaluating a downlink radio link quality on the second configured resource may include dropping evaluation samples taken before the first time.

Example 8 includes a method of operating a user equipment, the method comprising: for a first BFD-RS in a first configuration of resources, using an evaluation period having a first duration for evaluating a downlink beam quality on the first BFD-RS; at a first time, transitioning from the first configuration of resources to a second configuration of resources that is different from the first configuration of resources; for a second BFD-RS in the second configuration of resources, using an evaluation period having a second duration for evaluating a downlink beam quality on the second BFD-RS; and using a mixed evaluation period for evaluating a downlink beam quality on the first BFD-RS and the second BFD-RS, wherein the mixed evaluation period may begin prior to the first time and may end after the first time. In this Example, an active TCI state of a CORESET of the UE may remain unchanged during the mixed evaluation period, and the first BFD-RS may comprise a first CSI-RS. In this Example, the second BFD-RS may comprise the first CSI-RS or a second CSI-RS, wherein the active TCI State of the CORESET may indicate that the second CSI-RS is quasi-co-located with the CORESET.

Example 9 includes the method of Example 8 or some other example herein, wherein the second CSI-RS may comprise the first CSI-RS, and wherein an offset of the first CSI-RS before the first time may be different than the offset of the first CSI-RS after the first time and/or a periodicity of the first CSI-RS before the first time may be different than the periodicity of the first CSI-RS after the first time.

Example 10 includes the method of any of Examples 8-9 or some other example herein, wherein both of an evaluation period having the first duration that is adjacent to the mixed evaluation period and an evaluation period having the second duration that is adjacent to the mixed evaluation period may be in-sync evaluation periods.

Example 11 includes the method of any of Examples 8-9 or some other example herein, wherein both of an evaluation period having the first duration that is adjacent to the mixed evaluation period and an evaluation period having the second duration that is adjacent to the mixed evaluation period may be out-of-sync evaluation periods.

Example 12 includes the method of any of Examples 8-11 or some other example herein, wherein the method further comprises using evaluation samples based on the first BFD-RS for evaluating the downlink beam quality on the first BFD-RS and the second BFD-RS.

Example 13 includes the method of any of Examples 8-12 or some other example herein, wherein the method further comprises using evaluation samples taken before the first time for evaluating a downlink beam quality on the first BFD-RS and using evaluation samples taken after the first time for evaluating a downlink beam quality on the second BFD-RS.

Example 14 includes a method of operating a UE, the method comprising: for a first BFD-RS in a first configuration of resources, using an evaluation period having a first duration for evaluating a downlink beam quality on the first BFD-RS; at a first time, transitioning from the first configuration of resources to a second configuration of resources that is different from the first configuration; and for a second BFD-RS in the second configuration of resources, using an evaluation period having a second duration for evaluating a downlink beam quality on the second BFD-RS. In this Example, the evaluation period having the second duration may begin at the first time, and the transitioning may include changing an active TCI state of a CORESET of the UE from a first TCI state to a second TCI state that is different than the first TCI state. The first BFD-RS may comprise a first CSI-RS, and the second BFD-RS may comprise a second CSI-RS that is different than the first CSI-RS.

Example 15 includes the method of Example 14 or some other example herein, wherein both of an evaluation period having the first duration that ends prior to the first time and the evaluation period having the second duration may be in-sync evaluation periods.

Example 16 includes the method of Example 14 or some other example herein, wherein both of an evaluation period having the first duration that ends prior to the first time and the evaluation period having the second duration may be out-of-sync evaluation periods.

Example 17 includes the method of any of Examples 14-16 or some other example herein, wherein using the evaluation period having the second duration for evaluating a downlink beam quality on the second configured resource may comprise dropping evaluation samples based on the first configured resource.

Example 18 includes a method of operating a UE, the method comprising: in a first DRX mode, using an evaluation period having a first duration for evaluating a downlink beam quality on a BFD-RS; at a first time, transitioning from the first DRX mode to a second DRX mode that is different from the DRX mode; and using a mixed evaluation period for evaluating a downlink beam quality on the BFD-RS. In this Example, the mixed evaluation period may begin prior to the first time and may end after the first time, and an active TCI state of the CORESET of the UE may remain unchanged during the mixed evaluation period. In this Example, a DRX cycle periodicity of the first DRX mode may be different than a DRX cycle periodicity of the second DRX mode, or DRX may be active during a first one of the first DRX mode and the second DRX mode and inactive during a second one of the first DRX mode and the second DRX mode.

Example 19 includes the method of Example 18 or some other example herein, wherein both of an evaluation period having the first duration that is adjacent to the mixed evaluation period and an evaluation period having the second duration that is adjacent to the mixed evaluation period may be in-sync evaluation periods.

Example 20 includes the method of Example 18 or some other example herein, wherein both of an evaluation period having the first duration that is adjacent to the mixed evaluation period and an evaluation period having the second duration that is adjacent to the mixed evaluation period may be out-of-sync evaluation periods.

Example 21 includes the method of any of Examples 18-20 or some other example herein, wherein the method may further comprise using evaluation samples taken prior to the first time for evaluating the downlink beam quality in the first DRX mode and the second DRX mode.

Example 22 includes a method comprising of operating a UE, the method comprising: for a first configured resource in a first configuration of resources, using an evaluation period having a first duration for evaluating a downlink radio link quality on the first configured resource; at a first time, transitioning from the first configuration of resources to a second configuration of resources that is different from the first configuration of resources; and for a second configured resource in the second configuration of resources, using an evaluation period having a second duration for evaluating a downlink radio link quality on the second configured resource. In this Example, the evaluation period having the second duration may begin at the first time. In this Example, the transitioning from the first configuration of resources to the second configuration of resources may comprise at least one of: a transition from a first SSB that is QCLed with an active TCI state of a CORESET of the UE to a second SSB that is QCLed with the active TCI state; a transition from a first SSB that is QCLed with an active TCI state of a CORESET of the UE to a CSI-RS that is specified by an active TCI state of the CORESET; and a transition from a CSI-RS that is specified by an active TCI State of a CORESET of the UE to a first SSB that is QCLed with the active TCI state.

Example 23 includes the method of Example 22 or some other example herein, wherein both of the first configured resource and the second configured resource may be configured for RLM.

Example 24 includes the method of Example 22 or some other example herein, wherein both of the first configured resource and the second configured resource may be configured for BFD, and the downlink radio link quality may be a downlink beam quality.

Example 25 includes the method of any of Examples 22-24 or some other example herein, wherein using an evaluation period having the second duration for evaluating a downlink radio link quality on the second configured resource may include dropping evaluation samples based on the first configured resource.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, IE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   memory to store a configuration of a control resource set (CORESET); and
   processing circuitry coupled with the memory, the processing circuitry to:
   performing beam failure detection (BFD), based on in a first configuration of an active transmission configuration indicator (TCI) state using a first evaluation period that corresponds to the first configuration;
   at a first time, transition from the first configuration of the active TCI state to a second configuration of the active TCI state that is different from the first configuration of the active TCI state;
   performing BFD, based on the second configuration of the active TCI state, using a second evaluation period that corresponds to the second configuration.

2. The apparatus of claim 1, wherein both of the first evaluation period and the second evaluation period are in-sync evaluation periods.

3. The apparatus of claim 1, wherein both the first evaluation period and the second evaluation period are out-of-sync evaluation periods.

4. The apparatus of claim 1, wherein the processing circuitry is further to use evaluation samples based on a first beam failure detection reference signal (BFD-RS) associated with the first evaluation period for evaluating a downlink beam quality on the first BFD-RS and a second BFD-RS associated with the second evaluation period.

5. The apparatus of claim 1, wherein the processing circuitry is further to use evaluation samples taken before the first time for evaluating a downlink beam quality on a first BFD-RS associated with the first evaluation period and to use evaluation samples taken after the first time for evaluating a downlink beam quality on a second BFD-RS associated with the second evaluation period.

6. The apparatus of claim 1, wherein the processing circuitry is to:
use the first evaluation period for evaluating a downlink beam quality on a first BFD-RS in a first discontinuous reception (DRX) mode, and
at the first time, transition from the first DRX mode to a second DRX mode that is different from the DRX mode.

7. The apparatus of claim 6, wherein:
a DRX cycle periodicity of the first DRX mode is different than a DRX cycle periodicity of the second DRX mode, or
DRX is active during one of the first DRX mode and the second DRX mode and is inactive during the other of the first DRX mode and the second DRX mode.

8. The apparatus of claim 1, wherein the BFD based on the first configuration is performed using a first channel state information-reference signal (CSI-RS), and wherein BFD based on the second configuration is performed using either:
the first CSI-RS, or
a second CSI-RS, wherein the active TCI State of the CORESET indicates that the second CSI-RS is quasi-co-located (QCL) with the active TCI state.

9. The apparatus of claim 8, wherein the second CSI-RS comprises the first CSI-RS, and
wherein an offset of the first CSI-RS before the first time is different than the offset of the first CSI-RS after the first time, or a periodicity of the first CSI-RS before the first time is different than the periodicity of the first CSI-RS after the first time.

10. A method comprising:
performing beam failure detection (BFD), based on a first configuration of BFD resources, using a first evaluation period corresponding to the first configuration of BFD resources;
at a first time, transitioning from the first configuration of BFD resources to a second configuration of BFD resources that is different from the first configuration;
performing beam failure detection, based on the second configuration of BFD resources, using a second evaluation period that is after transitioning from the first configuration of BFD resources to the second configuration of BFD resources; and
performing beam failure detection, based on the second configuration of BFD resources, using a third evaluation period that is after the second evaluation period,
wherein the third evaluation period corresponds to the second configuration and the second evaluation period has a duration that is no less than a minimum duration of the first evaluation period and the third evaluation period.

11. The method of claim 10, wherein using the second evaluation period for evaluating a downlink beam quality on a second configured resource comprises dropping evaluation samples based on a first configured resource and taken prior to the first time.

12. The method of claim 10, wherein the transitioning includes changing an active transmission configuration indicator (TCI) state of a control resource set (CORESET) from a first TCI state to a second TCI state that is different than the first TCI state.

13. A method comprising:
for a first configured resource in a first configuration of resources, using an evaluation period having a first duration for evaluating a downlink radio link quality on the first configured resource;
at a first time, transitioning from the first configuration of resources to a second configuration of resources that is different from the first configuration of resources; and
for a second configured resource in the second configuration of resources, using an evaluation period having a second duration for evaluating a downlink radio link quality on the second configured resource, wherein the evaluation period having the second duration begins at the first time,
wherein the transitioning from the first configuration of resources to the second configuration of resources comprises at least one of:
a transition from a first synchronization signal/physical broadcast channel block (SSB) that is quasi-co-located (QCLed) with an active transmission configuration indicator (TCI) state of a control resource set (CORESET) of a user equipment (UE) to a second SSB that is QCLed with the active TCI state;
a transition from a first SSB that is QCLed with an active TCI state of a CORESET of the UE to a channel state information reference signal (CSI-RS) that is specified by an active TCI state of the CORESET; and
a transition from a CSI-RS that is specified by an active TCI State of a CORESET of the UE to a first SSB that is QCLed with the active TCI state.

14. The method of claim 13, wherein both of the first configured resource and the second configured resource are configured for radio link monitoring.

15. The method of claim 13, wherein both of the first configured resource and the second configured resource are configured for beam failure detection, and wherein the downlink radio link quality is a downlink beam quality.

16. The method of claim 13, wherein using the evaluation period having the second duration for evaluating a downlink radio link quality on the second configured resource includes dropping evaluation samples that are based on the first configured resource and taken prior to the first time.

17. The method of claim 13,
wherein the transitioning from the first configuration of resources to the second configuration of resources comprises at least one of:
a transition from a first SSB that is QCLed with an active TCI state of a CORESET of the UE to a second SSB that is QCLed with the active TCI state, or
a transition from a first SSB that is QCLed with an active TCI state of a CORESET of the UE to a channel state information reference signal (CSI-RS) that is specified by the active TCI state of the CORESET.

18. The method of claim 17, wherein both of an evaluation period having the first duration that ends prior to the first time and the evaluation period having the second duration are in-sync evaluation periods.

19. The method of claim 17, wherein both of an evaluation period having the first duration that ends prior to the first time and the evaluation period having the second duration are out-of-sync evaluation periods.

20. The method of claim 17, wherein using an evaluation period having the second duration for evaluating a downlink radio link quality on the second configured resource comprises dropping evaluation samples taken before the first time.

* * * * *